United States Patent [19]
Grubb et al.

[11] Patent Number: 5,225,925
[45] Date of Patent: Jul. 6, 1993

[54] SENSITIZED ERBIUM FIBER OPTICAL AMPLIFIER AND SOURCE

[75] Inventors: Stephen G. Grubb, Naperville; Douglas W. Anthon, Wheaton, both of Ill.; William L. Barnes, Basset; Janet E. Townsend, Hamble, both of United Kingdom

[73] Assignee: Amoco Corporation, Chicago, Ill.

[21] Appl. No.: 735,387

[22] Filed: Jul. 24, 1991

Related U.S. Application Data
[63] Continuation-in-part of Ser. No. 644,460, Jan. 23, 1991.

[51] Int. Cl.[5] .................................................. H01S 3/16
[52] U.S. Cl. ....................................... 359/341; 359/343; 372/6
[58] Field of Search ................ 359/341, 343; 385/1; 372/6; 501/45

[56] References Cited

U.S. PATENT DOCUMENTS

| | | | |
|---|---|---|---|
| 3,533,956 | 10/1970 | Snitzer | 359/341 |
| 3,590,004 | 6/1971 | Woodcock | 359/341 |
| 3,731,226 | 5/1973 | Snitzer et al. | 359/341 |
| 3,978,427 | 8/1976 | Truscott | 372/6 |
| 3,979,322 | 9/1976 | Aleexeev et al. | 372/6 |
| 4,248,732 | 2/1981 | Myers et al. | 501/45 |
| 4,938,556 | 7/1990 | Digonnet et al. | 359/341 |
| 4,962,067 | 10/1990 | Myers | 501/45 |
| 5,032,315 | 7/1991 | Hayden et al. | 252/301.4 P |
| 5,053,360 | 10/1991 | Myers et al. | 501/48 |

FOREIGN PATENT DOCUMENTS 262018 11/1988 German Democratic Rep.
0191029 9/1985 Japan .................................. 501/45

OTHER PUBLICATIONS

Grubb et al.; IEEE Photonics. Lett., vol. 4, #6, pp. 553-555, Jun. 1992.
Artemen et al.; Opt. Spectrosc., vol. 54, #2, pp. 157-161; Feb. 1983.
Barnes et al.; Jour. Lightwave Tech.; vol. 7, #10, Oct. 1989, pp. 1461-1465.
Artemen et al.; Sov. J. Quant. Electron.; vol. 11, #9, Sep. 1981, pp. 1266-1268 (abstract only provided).
Hanna et al.; Optics Communication, vol. 63, #6, Sep. 15, 1987, pp. 417-420.

*Primary Examiner*—Nelson Moskowitz
*Attorney, Agent, or Firm*—Steven G. Mican

[57] ABSTRACT

An optical fiber for amplifying or sourcing a light signal in a single transverse mode. The fiber comprises a host glass doped with erbium (Er) and a sensitizer such as ytterbium (Yb) or iron (Fe). Preferably the host glass is doped silicic glass (e.g., phosphate or borate doped). Electrical energy is provided to diode lasers that pump the Nd laser rod, which in turn pumps the fiber. Such a configuration for pumping the fiber provides a high energy transfer from the diodes to the Nd laser rod, which in turn enables high pumping powers to be coupled into the single-mode co-doped fiber. Based on the amplification characteristics of the co-doped fiber and the efficient coupling of power from the laser diodes, the amplifier provides power and small signal gains comparable to the best observed, while requiring only conventional and readily available diode-based pump sources.

39 Claims, 6 Drawing Sheets

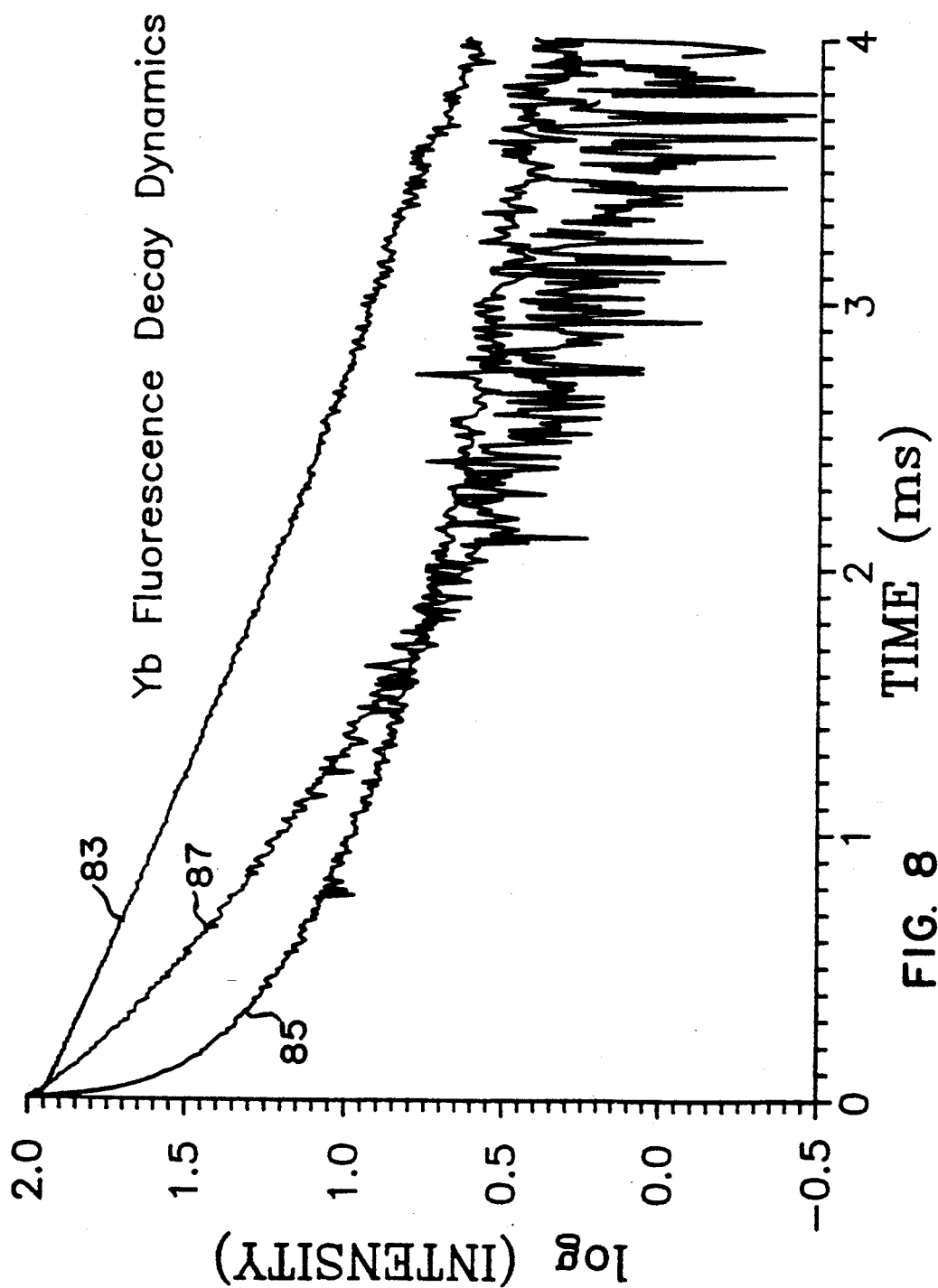

SENSITIZED ERBIUM FIBER OPTICAL AMPLIFIER AND SOURCE

CROSS REFERENCE TO RELATED APPLICATIONS

This application is a continuation-in-part of U.S. patent application Ser. No. 07/644,460 by Grubb et al., filed Jan. 23, 1991.

TECHNICAL FIELD OF THE INVENTION

The invention is related to optical amplifiers and sources and, more particularly, to erbium optical fibers for amplifiers and sources pumped by a diode laser source.

BACKGROUND OF THE INVENTION

Optical amplifiers have attracted a great deal of attention for use in fiber optic communications systems. They exhibit high gain, low noise, negligible crosstalk and intermodulation distortion, bit-rate transparency, and polarization insensitive gain. These properties make optical fibers superior to semiconductor devices as amplifiers in fiber optic systems. Moreover, fiber-based amplifiers do not require conversion from photon energy to electrical energy as do semiconductor devices.

In a communications system of any significant size, there is typically a distribution network that includes long communication paths and nodes where the network branches. In such a network, amplifiers are required in order to maintain the amplitude of the signal and the integrity of any data it carries in route between a source and destination. For these amplifiers to function properly, they must exhibit high small signal gains and/or high output saturation powers.

Application of erbium-doped optical fibers as amplifiers has received a lot of attention recently because the characteristic gain bandwidth of these fibers is within the third telecommunications window of 1.5 microns commonly used in fiber optic communications systems. Recent efforts in designing erbium fiber amplifier systems has focused on providing the optimum wavelength for pumping the erbium, with regard to both the efficiency of the small signal gain and availability of long-lived pump sources having relatively high optical output quality. Diode lasers have been a focus of interest as pumping sources because of their high electrical-to-optical conversion efficiencies, long lives and small size. Because of these qualities, laser diodes are typically considered to be the most commercially viable pump sources.

Many wavelengths and pump sources have been tried for directly pumping erbium in erbium-doped fibers. For example, in order of their representative gain efficiency the following pump wavelengths have been explored: 980 nm (4 dB/mW), 1480 nm (2.5 dB/mW), 532 nm (1.5 dB/mW), 660 nm (0.5 dB/mW), and 807 nm (0.2 dB/mW). Directly pumping erbium at the wavelengths of 980 or 1480 nm is currently the most popular approach and both pump wavelengths have been directly provided by diode lasers.

In terms of gain efficiency, directly pumping an erbium-doped fiber at a wavelength of 980 nm is the most attractive, but availability of diode lasers at this wavelength is limited and serious issues concerning the lifetimes of strained-layer InGaAs diodes at this wavelength have not been resolved. As an alternative to pumping at a wavelength of 980 nm, erbium amplifiers have been pumped on the edge of the 1550 band at 1480 nm with InGaAsP diode lasers. The gain efficiency of pumping at 1480 nm is not as high as pumping at 980 nm, but pump diodes at 1480 nm currently have longer demonstrated lifetimes than diodes at 980 nm. There are some additional advantages to pumping at a wavelength of 1480 nm. One advantage is that the pump wavelength is close to the signal wavelength and therefore it is relatively easy to ensure single-mode operation of the erbium fiber at the pump wavelength, a condition necessary to achieve efficient gain. The gain profile for pumping at 1480 nm is also broader than for pumping at 980 nm, an advantage for wavelength division multiplying (WDM) applications. Conversely, the noise performance of a 1480 nm pumped erbium fiber amplifier is intrinsically worse than a 980 nm pumped amplifier due to the lower value of the inversion parameter.

Although some degree of success has been achieved toward the goal of providing an erbium-doped fiber amplifier having high small signal gain efficiency and long life, the power saturation output remains relatively low (R. Baker, *Physics World*, pp. 41–44, March 1990.). The power saturation output of a fiber is typically given as the output power (dBm) that decreases the small signal gain by three (3) decibels (dB). In general, a fiber is characterized by a steady small signal gain that is maintained over a wide range of power outputs (i.e., photon density). As the input signal of the fiber increases in power, the power of the output signal reaches a saturation condition that causes the small signal gain to decrease with any additional increase in the power of the input signal.

In order to increase the level of power saturation in erbium-doped fiber pumping at the wavelength of 532 nm has attracted a great deal of attention because of the availability of frequency-doubled, diode-pumped Nd:YAG lasers of high output power and high spatial mode quality (A. Righetti et al., Electr. Lett., 26(5), p. 330, 1990). The overall efficiency (i.e., electron-to-photon conversion) of any erbium amplifier system based on frequency-doubled diode-pumped lasers, however, is very low (i.e., 2% at 532 nm compared to 15% for the fundamental frequency) precluding its use in some applications such as repeaters.

Although laser diodes at 808 nm are widely available, their use as pumps for erbium fiber amplifiers has generally been dismissed because of the strong excited-state absorption (ESA) of erbium at 807 nm, which seriously limits the efficiency of such amplifiers. As a result of the intense ESA in the 807 nm pump band for an erbium fiber, only small gains have been observed (e.g., six dB-T.J. Whitely, "Laser Diode Pumped Operation of $Er^{3+}$-Doped Fibre Amplifiers" *Electron. Lett.* 1988, No. 24; p. 1537)

A laser based on a ytterbium-erbium co-doped phosphatic glass rod has been pumped by a Nd:YAG laser at its 1064 nm output. Hanna et al., "A 1.54 $\mu m$ Er Glass Laser Pumped By A 1.064 $\mu m$ Nd: YAG Laser", *Optics Communications*; Vol. 63, No. 6, Sep. 15, 1987: pp. 417–420. Hanna et al. reports experimental results indicating the co-doped phosphatic glass rod may make a laser of reasonable gain and efficiency for use as a source of 1540 nm radiation in a communications system.

Hanna et al. speculates that a single mode, co-doped ytterbium-erbium fiber may replace the ytterbium-erbium co-doped phosphatic glass rod in order to provide a low lasing threshold that is compatible with pumping by a low-power Nd:YAG laser, which in turn is pumped by a diode. The low threshold characteristics of the fiber are thought by Hanna et al. to be one modification of their experimental laser that would increase pumping efficiency and allow a low-power Nd:YAG laser to be used as a pump source while maintaining reasonable efficiency characteristics for the co-doped erbium glass laser. Like all bulk laser glass, however, the single-pass gain of the co-doped erbium glass rod laser measured by Hanna et al. is low and, therefore, does not suggest the co-doped glass could be successfully employed in a fiber of an optical amplifier to provide high gain and/or high output saturation power.

SUMMARY OF THE INVENTION

It is the primary object of the invention to provide an erbium glass optical fiber that is suitable for use in an amplifier or source that may be indirectly pumped by readily available 808 nm laser diodes that produces a much greater power saturation output than previously available from amplifiers or sources pumped by such devices. In this connection, it is also an object of the invention to provide an optical amplifier, having the foregoing characteristic, whose small signal gain is substantially as great as previously available from the best erbium glass optical amplifiers.

It is a specific object of the invention to provide a highly efficient, long-lived erbium glass optical amplifier that is generally suitable for high power applications, particularly in the area of fiber optic communications networks.

It is a further object of the invention to provide an erbium glass optical amplifier having an optical noise figure at or near the quantum limit.

This invention provides for the use of high-power, diode-pumped $Nd^{3+}$ lasers to pump into the broad absorption bands of a sensitizer such a $Yb^{3+}$ or $Fe^{3+}$/$Fe^{2+}$ with subsequent energy transfer to $Er^{3+}$ in co-doped optical fibers. The properties of $Nd^{3+}$ lasers are well known. In this regard, they are relatively efficient and provide a diffraction-limited output. Moreover, because they are well-known and widely used devices, they are reliable. Because of their diffraction limited output characteristic, $Nd^{3+}$ lasers are well suited as a source for coupling high powers into a single-mode optical fiber.

Diode lasers operating at the 808 nm band are also well known. They are reliable and efficient and capable of providing high power outputs. The outputs from these diode lasers, however, are not diffraction limited and typically the coupling into a single mode fiber is poor. Recently, efficient coupling from multistripe diode laser arrays to $Nd^{3+}$ lasers has become available. In this regard, U.S. Pat. No. 4,710,940 to Sipes discloses a highly efficient single-mode Nd:YAG laser pumped by the multimode outputs of laser diode arrays. Using the efficient coupling disclosed in the Sipes patent, applicants have coupled up to 300 mW of power from a commercially available diode-pumped Nd:YAG laser pump source into single-mode optical fiber, a substantially greater amount than has been achieved with any diode laser source directly.

In the invention, highly efficient diode-pumped $Nd^{3+}$ lasers pump the ytterbium and erbium doped, single-mode fiber and couple several hundred milliwatts of power into the fiber, power that is nearly an order of magnitude greater than that possible by directly pumping the fiber with a diode laser. Because the output saturation power in an erbium fiber amplifier is a function of the power available from the pump source (rather than a limiting characteristic of a given fiber), the high-power pumping provided by diode-pumped $Nd^{3+}$ lasers leads to larger output saturation powers for the fiber that are of primary interest in power amplifier applications such as fiber optic communications networks.

Sensitizing an erbium fiber by co-doping it with ytterbium or iron has the advantage of overlaying the intense broad absorption of the ytterbium or iron over the relatively narrow and weak absorption bands of erbium. Co-doping drastically decreases the wavelength sensitivity of the pump source and, thereby, allows pumping of the fiber outside the excited state absorption (ESA) bands of erbium. If the erbium can be nearly fully inverted in the sensitized fiber, the noise figure can approach the quantum limit of 3 dB.

The benefit of decreased wavelength sensitivity and reduced ESA achieved by co-doping is somewhat offset in ordinary silicic glass fiber by the limited efficiency of the ytterbium-to-erbium energy transfer and the back transfer of energy from the $^4I_{11/2}$ state of erbium. It has been shown, however, that the transfer of energy from ytterbium to erbium is more efficient in a phosphatic glass. Additionally, the rate of back transfer of energy from erbium to ytterbium is drastically decreased in the phosphatic glass. This is due to the fact that the lifetime of the erbium $^4I_{11/2}$ state in a phosphatic glass is 30 times shorter than in ordinary silicic glass, thereby decreasing the probability of back transfer of energy. In view of the foregoing, the fiber is preferably a ytterbium-erbium, co-doped single mode fiber in a phosphatic glass, a phosphate or borate doped silicic glass fabricated by the chemical vapor deposition (CVD) process, or other hosts and/or selective dopants that minimize the Er $^4I_{11/2}$ lifetime while substantially preserving the Er $^4I_{13/2}$ metastable lifetime.

However, phosphate-doped silicic glass fibers are easily fusion spliced to and they are essentially of the same index of refraction, thus assuring negligible backreflection at the interfaces. Phosphate-based fibers do not have such compatibility. In addition, it is not practical to fabricate a phosphatic glass fiber by the modified chemical vapor deposition process used for silicate-based fibers. A phosphate-doped silicic glass fiber fabricated by the modified chemical vapor deposition process is likely to have lower loss characteristics than the phosphatic glass fibers fabricated by the rod-in-tube method. Fiber parameters such as numerical aperture are also easier to control using the modified chemical vapor deposition process. In view of the foregoing, the fiber is preferably a ytterbium-erbium, co-doped single mode fiber comprising a phosphate-doped silicic glass fabricated by the chemical vapor deposition (CVD) process, a ytterbium-erbium, co-doped single mode fiber comprising a phosphatic glass fabricated by the rod-in-tube method, or other hosts and/or selective dopants that minimize the Er $^4I_{11/2}$ lifetime while substantially preserving the Er $^4I_{13/2}$ metastable lifetime.

BRIEF DESCRIPTION OF THE INVENTION

FIG. 8 is a graphical representation of ytterbium fluorescence decay for three different silicic glass optical fibers, one having ytterbium doping alone, another having erbium and ytterbium together, and a third having erbium and ytterbium together with a high concentration of alumina.

DETAILED DESCRIPTION OF THE INVENTION

Figure 1:
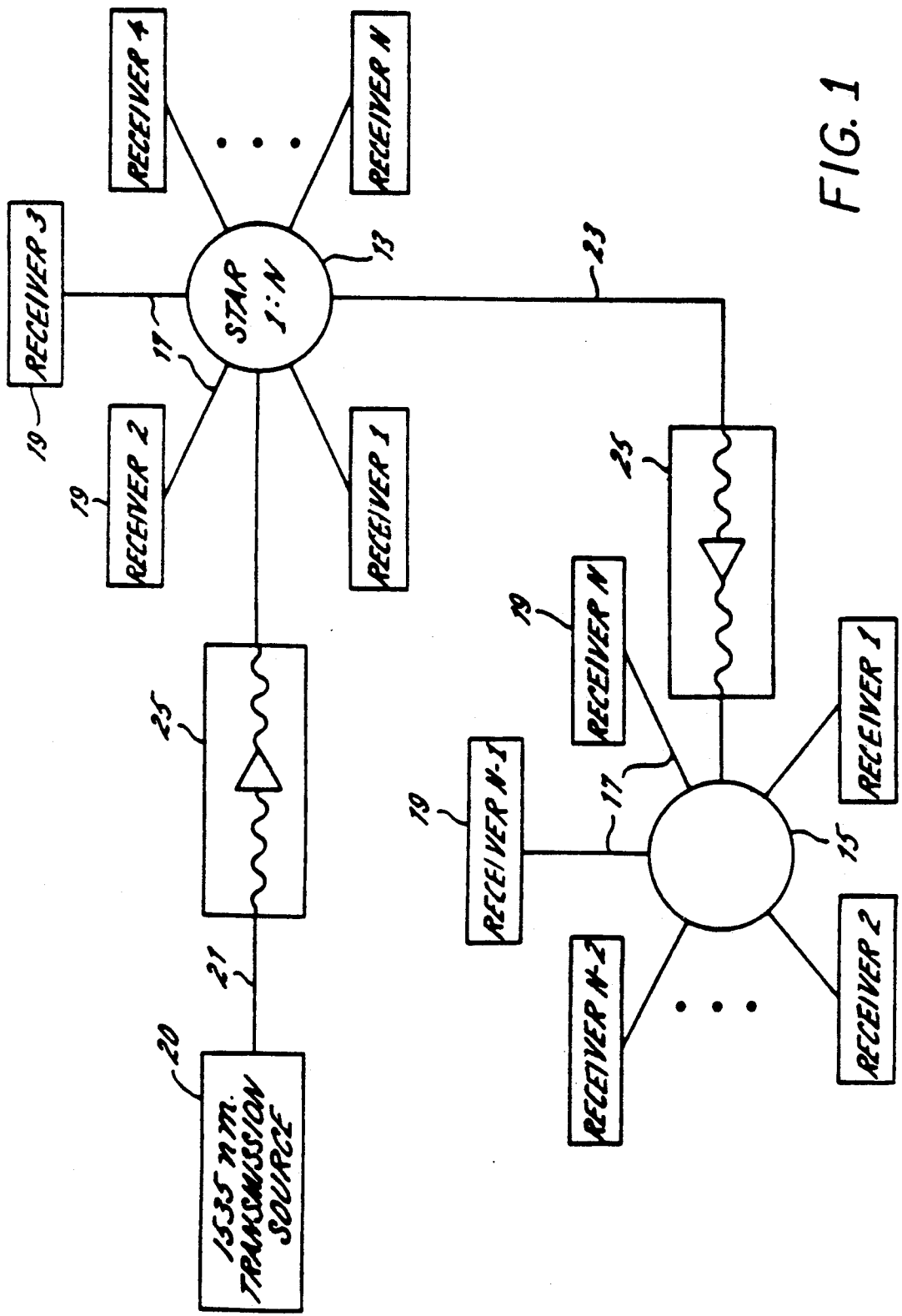
FIG. 1 is a schematic block diagram of an optical communications system incorporating optical amplifiers that utilize erbium glass fibers co-doped with a sensitizer such as ytterbium in accordance with the invention.

Turning to the drawings and referring first to FIG. 1, an exemplary optical communication system is illustrated that incorporates optical amplifiers 11 made according to the invention. The illustrated system employs two distribution stars 13 and 15, each distributing one incoming optical signal into N fiber optic branches 17. Each branch 17 leads to a receiver 19 that may either provide for optical processing of the signal carried by the fiber optics or provide for the conversion of the signal to an electrical signal. An example of the latter is a cable television system, wherein the receivers convert the optical signal to an electrical signal that is received by a CRT monitor connected to each of the receivers.

In the illustrated communications system, an optical signal at a characteristic frequency of 1535 nm is provided by a transmission source 20 such as a cable television operator. The main truck lines 21 and 23 of the system are conventional fiber optic cables designed for low loss transmission at the third telecommunications window about 1.5 $\mu$m.

For fiber optic systems in commercial use today, the optical signal typically must be converted to an electrical signal at communications nodes such as the stars 13 and 15 as well as in between the nodes because of the need to amplify the signal before it is distributed. If the signal is not amplified, the signals received into the branches of a node are unacceptably weak for many applications. For example, in a cable television system, a communications node that distributes a signal directly to receivers in the homes of subscribers must have sufficient power to convert to a usable electrical signal. This usually means that the optical signal must be strong enough to be received by a photodiode with a suitably high signal-to-noise ratio. In a multi-channel analog CATV system, the power required to reliably drive a photodiode is relatively high and demands a strong optical signal as its input. Therefore, these types of communications systems that employ optical fibers are required to convert optical signals to electrical signals at the communications nodes in order to amplify the signal before passing it to a branch. Furthermore, if one of the branches carrying an amplified signal is an optical fiber, the signal must be converted again in order to return it to an optical signal for transmission. Such conversions of the signal make the system nodes complex, expensive, inefficient and noisy due to many in-line amplifiers.

In the illustrated communications system, the distribution stars 13 and 15 are all-optical nodes such as 1×N splitters manufactured by Gould Inc. of Glen Burnie, Md. Distribution stars are not commonly used in commercial communications systems today. Heretofore, there has not been available optical amplifiers that are capable of sufficiently boosting the power of the input signal to the star so that each of the output optical signal maintains sufficient power to drive a photodiode.

In the optical communications system of FIG. 1, a high power and high gain optical amplifier 25 made according to the invention is placed at strategic points in the system for the purpose of providing a high power optical signal to each of the distribution stars 13 and 15, thereby allowing the system to maintain the signal as an optical signal until it reaches its destination. The amplifier 25 includes an amplifying fiber that is pumped by a neodymium (Nd) laser rod that in turn is pumped by at least one laser diode that provides a high energy light output. The fiber has an inner core and an outer cladding dimensioned to amplify the light signal in a single mode. The glass of the inner core is doped with erbium ($Er^{3+}$) and a sensitizer such as ytterbium ($Yb^{3+}$) or iron ($Fe^{3+}$ or $Fe^{2+}$). The fiber is end pumped and is coupled at its ends to maintain fibers in a manner that ensures optical feedback is minimized.

Figure 2:
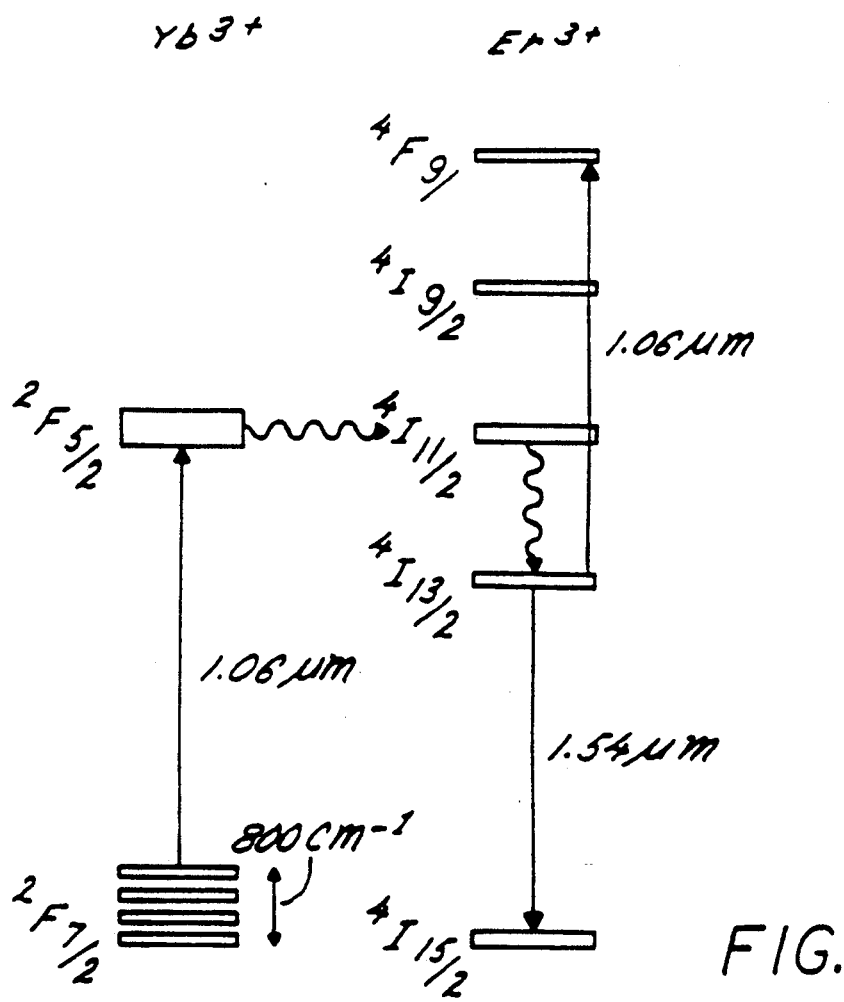
FIG. 2 is a quantum level diagram using conventional spectroscopic notation to illustrate the energy transfer from a laser diode pump source to the sensitizer and then to the erbium of the glass fiber.

Referring now to FIG. 2, a glass fiber according to the invention is co-doped with erbium ($Er^{3+}$) and ytterbium ($Yb^{3+}$). The fiber absorbs 1.06 $\mu$m pump radiation. The absorbed radiation excites $Yb^{3+}$ ions from the highest sublevel of the $^2F_{7/2}$ quantum level to the $^2F_{5/2}$ quantum level. The $Yb^{3+}$ ions return to the $^2F_{7/2}$ quantum level as they release energy through a non-radiative transfer that occurs from the $^2F_{5/2}$ quantum level of $Yb^{3+}$ to the $^4I_{11/2}$ quantum level of $Er^{3+}$. The $Er^{3+}$ ions release energy through nonradiative decay that occurs from the $^4I_{11/2}$ quantum level of $Er^{3+}$ to the metastable $^4I_{13/2}$ quantum level of $Er^{3+}$. Finally, the $Er^{3+}$ ions provide amplification emission through radiation that occurs as they release energy from the metastable $^4I_{13/2}$ quantum level to the ground level of $Er^{3+}$ at $^4I_{15/2}$.

In a glass fiber co-doped with $Yb^{3+}$ and $Er^{3+}$, the narrow and relatively weak absorption bands of $Er^{3+}$ at 807 nm and 980 nm are overlaid by the intense and broad absorption of $Yb^{3+}$ centered at 960 nm. By co-doping an $Er^{3+}$ fiber with $Yb^{3+}$, it is not as sensitive to the wavelength of a pump source as it would be if the $Er^{3+}$ were pumped directly since it is the $Yb^{3+}$ that is directly pumped rather than the $Er^{3+}$. Also, co-doping an $Er^{3+}$ fiber with $Yb^{3+}$ allows the fiber to be pumped outside the range of strong excited state absorption (ESA) of $Er^{3+}$. According to the invention, the pump source for the co-doped fiber provides radiation at 1.06 $\mu$m, which is absorbed by the $Yb^{3+}$ and then transferred to the $Er^{3+}$. Some ESA can occur when the fiber is pumped in this manner since the 1.06 $\mu$m radiation of the pump source can be directly absorbed by the $Er^{3+}$ from the $^4I_{13/2}$ metastable quantum level to the $^4F_{9/2}$ quantum level. Such ESA at 1.06 $\mu$m by the $Er^{3+}$ is not strong, however, and the efficiency of the energy transfer from the pump source to the lasing radiation at 1.54 μm is high.

In the past, co-doped $Er^{3+}/Yb^{3+}$ fibers have been most commonly silicic glass. Such silicic glass fibers have not generated a great deal of interest for commercial applications, however, because of the limited efficiency of the energy transfer from the $^2F_{5/2}$ level of $Yb^{3+}$ to the $^4I_{11/2}$ level of $Er^{3+}$ caused by the back transfer of energy from the $^4I_{11/2}$ level of $Er^{3+}$ to the $^2F_{5/2}$ level. Because of the limited efficiency of the energy transfer from $Yb^{3+}$ to $Er^{3+}$, it was commonly believed that co-doped $Er^{3+}/Yb^{3+}$ fiber performed no better than fiber doped only with $Er^{3+}$ and directly pumped at 808 nm, where a strong ESA occurs. However, it has been recognized that the transfer of energy from $Yb^{3+}$ to $Er^{3+}$ is more efficient in a phosphatic glass than in a silicic glass (E. F. Artem'ev, *Sov. J. Quantum Electron.*, 11(9), 1266, 1981). Specifically, the rate of back transfer from $Er^{3+}$ to $Yb^{3+}$ is drastically decreased in phosphatic glass as compared to silicic glass because the lifetime of the $^4I_{11/2}$ state in $Er^{3+}$ in a phosphatic glass host is approximately 30 times shorter than in silicic glass, thereby decreasing the probability of the back transfer of energy.

Figure 3:
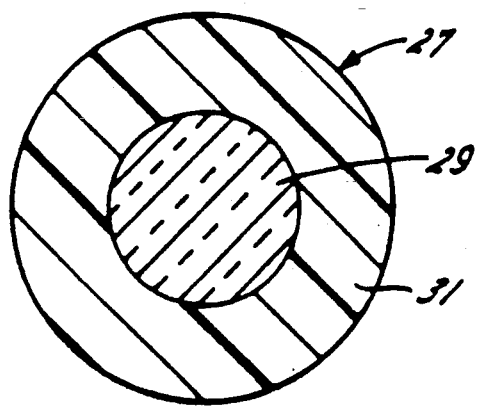
FIG. 3 is a cross-sectional view of an erbium fiber in one of the optical amplifiers of FIG. 1.

Applicants commissioned Schott Glass of Duryea, Pa. to make custom melts of an Er/Yb phosphatic glass, along with an undoped phosphatic glass to be used as the cladding material in the fabrication of the optical fiber 27 shown in FIG. 3. The glass melts were requested to be performed under rigorously dry conditions as water is an efficient quencher of the $^4I_{13/2}$ state of the $Er^{3+}$ ion. For the core 29 of the fiber 27, the base glass was Schott LG-750 (a potassium-barium-aluminum phosphatic glass) doped with a requested 12 percent by weight $Yb^{3+}$ and a range of percents by weight $Er^{3+}$. The glass for the cladding 31 of the fiber was also an LG-750 base glass (undoped with rare-earth ions) and was requested to have an expansion coefficient and glass softening point slightly higher than the doped core glass and a similar glass softening point, while being approximately 0.6% lower in index of refraction. It is desirable for the cladding glass expansion coefficient to be larger than that of the core so that the core is under compression during cooling of the optical fiber. This leads to a low loss interface between the two glasses. The index of refraction of the cladding glass, and therefore the numerical aperture of the fiber, are presently being fine tuned in order to maximize the performance of the fiber by varying the ratios of Ba, K and Na constituent elements in new samples requested from Schott Glass. In order to determine the precise composition of one of the Schott LG-750 glasses, samples of the glass for the core 29 and cladding 31 were prepared for analysis by using a portion of each with a lithium flux. The resulting melt was then dissolved with dilute nitric acid. The solutions were analyzed using conventional emission instrumentation using inductively coupled plasma atomic emission, commonly called ICP. From the spectral line emissions of the samples, the principal, minor and trace constituents of the two glasses were determined. The data resulting from the analysis is set forth below as Table I.

TABLE I

| Sample | Percentage of Element by Weight | | | | | | | |
|---|---|---|---|---|---|---|---|---|
| | P | Ba | Al | K | Na | Ca | Yb | Er |
| Cladding | 25.5 | 19.5 | 5.0 | 8.2 | 0.18 | <0.005 | 0.097 | <.001 |

TABLE I-continued

| Sample | Percentage of Element by Weight | | | | | | | |
|---|---|---|---|---|---|---|---|---|
| | P | Ba | Al | K | Na | Ca | Yb | Er |
| Core | 23.0 | 11.6 | 3.2 | 8.5 | 0.48 | <0.005 | 10.9 | 0.12 |

The glass analyzed in Table I has not provided the best performance characteristics relative to other samples with different percentage doping of $Er^{3+}$. Specifically, the best performance thus far has been for core glass whose percentage doping of $Er^{3+}$ is approximately 0.5 percent and 12 percent by weight $Yb^{3+}$.

In order to fabricate a fiber according to the invention, we requested that the Optical Fibre Group at the University of Southampton, England, fabricate a single-mode optical fiber comprising the best performing glasses, using the rod-in-tube method. Rods of the two glasses for the core cladding were drilled out with an ultrasonic drill. The rods were then fire polished in order to provide smooth surfaces and, therefore, lower losses at the interface. The rods were kept in a furnace at 400° C. for two hours in an attempt to drive off excess water. In this regard, particular attention was directed to fabricating the fiber 27 in a dry atmosphere since it was determined that trace amounts of $H_2O$ leads to excess loss in the 1.5 μm region as well as quenching of the $^4I_{13/2}$ metastable lifetime in $Er^{3+}$. The fabricated fiber 27 had a numerical aperture of 0.14 and a core diameter of 4.9 microns. A relatively large core diameter is desirable since we have noticed a strong quenching effect on the metastable lifetime of the $^4I_{13/2}$ state in $Er^{3+}$ as the core diameter decreases below approximately 5 microns. This effect is possibly due to diffusion of impurities at the interface between the core and cladding.

Although applicants have found the Schott phosphatic glass one suitable host for the invention, other host glasses are preferred, either because of improved optical properties or advantageous fabrication features (e.g., vapor deposition instead of the rod-in-tube method). The important criteria for selecting a host glass is the maintaining of an efficient transfer of energy from the $Yb^{3+}$ to the $Er^{3+}$.

In the preferred embodiment, the Er/Yb energy transfer system is used in a phosphate-doped fused silicic glass fiber. We find that erbium in a silicic glass host that is doped with a small amount of phosphate relative to the aforementioned phosphatic glass is spectroscopically similar to the phosphatic glass fluorescence spectrum. Specifically, we note a factor of two narrowing in the fluorescence of the $^4I_{13/2}$ to $^4I_{15/2}$ emission and significant shortening of the $^4I_{11/2}$ lifetime relative to erbium in a germanosilicate fiber. Furthermore, we find that the addition of a significant amounts of $Al_2O_3$, commonly used to prevent clustering of the rare-earth dopants, leads to a decrease in the energy transfer efficiency of the co-doped Er/Yb system. The phosphate glass from Schott contained an amount of $Al_2O_3$ that most likely did not allow us to fully optimize the energy transfer efficiency. The phosphate-doped fused silicic glass fiber is easier to fusion splice into a silicic glass fiber system than a phosphatic glass fiber. The phosphate-doped silicic glass fiber also has essentially the same index of refraction as the silicic glass fibers in the system that are coupled to it, thus assuring negligible backreflection at the interfaces. In addition, a silicic glass fiber fabricated by the modified chemical vapor deposition process or other techniques has lower loss characteristics than the phosphatic glass fibers fabricated by the rod-in-tube method. Fiber parameters such as numerical aperture are also easier to control. Other host glasses such as borates and phosphoborates may also be suitable for efficient operation of an Er/Yb co-doped fiber.

A screening mechanism for identifying host glasses comprises measurement of the lifetime of the $^4I_{11/2}$ state of $Er^{3+}$ in different host materials. Short lifetimes [would] lower the probability of back transfer of energy to the $^2F_{5/2}$ state of $Yb^{3+}$. Selective quenchers such as $D_2O$ when added in small amounts to the core glass may effectively quench the $^4I_{11/2}$ state of $Er^{3+}$ while leaving the $^4I_{13/2}$ metastable state relatively unaffected. In this regard, silicic glass can be doped with $D_2O$ in order to enhance the non-radiative decay from the $^4I_{11/2}$ state of $Er^{3+}$, thereby reducing the back transfer of energy to $Yb^{3+}$.

Silicic glass fibers that have been co-doped with ytterbium and erbium according to the prior art have exhibited poor energy transfer efficiency, primarily due to the relatively long lifetime of the $^4I_{11/2}$ quantum energy level of erbium. For example, the initial transfer energy of a Er/Yb co-doped germanosilicic glass fiber according to the prior art has been measured to be in the range of 5 percent, as compared to approximately 90 percent with a Er/Yb co-doped phosphatic glass fiber. However, according to the invention, when a co-doped Er/Yb silicic glass fiber is also doped with small amounts of phosphorus, the fiber mimics the spectroscopic environment of a co-doped Er/Yb phosphatic glass fiber. Thus, this phosphate-doped silicic glass fiber has an efficiency for initial transfer efficiency of at least 90 percent. In fact, such phosphate-doped silicic glass fibers actually exhibit greatly improved properties relative to the phosphatic glass fibers.

In the preferred embodiment, the invention comprises a silicic optical fiber that is doped with unique proportions of phosphorus, erbium and ytterbium to provide a lasing medium that is ideally suited for solid state laser amplifiers and sources that operate in the 1.5 nm range. The concentration of phosphorus dopant is optimized to minimize the $^4I_{11/2}$ quantum level lifetime of erbium. Only a very small of the phosphorus dopant is used relative to the pure phosphatic glass fiber. The phosphate-ytterbium-erbium-doped silicic glass fiber has been unexpectedly discovered to have greatly improved properties relative to the phosphatic glass fibers. In particular, the initial transfer efficiency of this fiber is even better than the phosphatic glass fibers, on the order of approximately 95 percent, and the rise time of the energy transfer to the metastable $^4I_{13/2}$ quantum level of $Er^{3+}$ from the $^2F_{5/2}$ quantum level of $Yb^{3+}$. is in the range of approximately 15 to 30 microseconds, as compared to approximately 40 to 60 microseconds for the phosphatic glass fibers.

The concentration of ytterbium dopant is optimized to saturate its absorption of pump energy throughout the fiber. In this connection, it is desirable to have a concentration of ytterbium that has a transverse gradient through the fiber in proportion to that of the pump beam that passes through the fiber. The transverse gradation of the $Yb^{3+}$ sensitizer with a constant $Er^{3+}$ concentration would also lead to higher efficiencies. It is also desirable to have a concentration of ytterbium that has an axial gradient in proportion to that of the pump beam that passes through the fiber.

The composition of the glass fiber according to the invention is believed to form controlled clustering with the ytterbium ions, so that each of a large proportion of the erbium ions have a cluster of ytterbium ions around them. This controlled clustering increases energy transfer between them. In this connection, the ratio of the concentrations of phosphorus and alumina, as well as ytterbium and erbium in the fiber is crucial to provide high efficiency.

Although alumina has commonly been added to fibers to improve the solubility of the ytterbium and erbium ions in the fiber, even small concentrations of alumina in the fiber have been found to have a deleterious effect upon the ytterbium/erbium energy transfer system. For instance, as indicated above, the initial transfer efficiency of the ytterbium/erbium energy transfer system is on the order of 95 percent, as indicated above. This efficiency is reduced to approximately 30 percent when as little as 11 mole percent of alumina is doped into the fiber. Therefore, the optical fiber should be as free of alumina as possible to provide good energy transfer.

The silicic glass fibers according to the invention are preferably fabricated by the solution doping process. A phosphosilicate frit is deposited, via the conventional MCVD process, at a temperature to ensure complete oxidation and deposition, without fusion to a glass. This temperature is generally in the range of approximately 1100° to 1500° C. An aqueous solution of high purity rare-earth and aluminum chlorides is diffused into the frit, with the resulting fiber ion concentration being proportional to the solution concentration.

The phosphosilicate frit is heated in the presence of $Cl_2$, $N_2$ as well as or instead of $Cl_2$, $O_2$, or the combination thereof, to remove the solvent. The frit is sintered to a glass, preferably at a temperature in the range of approximately 1200° to 1800° C., thus trapping the dopant ions. The preform collapse and fiber drawing are then done in the conventional fashion as known in the art.

In order to determine the precise composition of one of the phosphate-doped silicic glass fibers according to the preferred embodiment, a sample of the glass was prepared for analysis by a SEM/EDX (Scanning Electron Microscope/Energy Dispersive X-Ray) analysis. From this analysis of the sample, the principal, minor and trace constituents of the glass were determined. The data resulting from the analysis is set forth below as Table II.

TABLE II

| | Percentage of Element by Weight | | | | |
|---|---|---|---|---|---|
| | Al | Si | P | Er | Yb |
| Sample | 0.54 | 32.42 | 9.32 | 0.68 | 6.58 |

For purposes of comparison, the physical characteristics of three different phosphate-doped silicic glass fibers and the phosphatic fiber described above are tabulated in Table III. Fiber No. 1 is doped with erbium, but not with ytterbium. Fiber No. 2 is doped with erbium, ytterbium and a relatively high concentration of alumina. Fiber No. 3 is the fiber whose constituents are shown in Table III. The data for fibers Nos. 1 and 2 were determined by refractive index profile measurements. The data for fiber No. 3 was determined by SEM/EDX analysis. The data for fiber No. 4 was determined by ICP analysis.

TABLE III

| Fiber | Core Comp. (mol %) | N.A. | Er$^{3+}$ (ppm) | Yb$^{3+}$ (ppm) |
|---|---|---|---|---|
| No. 1 | P$_2$/Al$_2$/Si:2/4/94 | 0.15 | 800-1100 | 0 |
| No. 2 | P$_2$/Al$_2$/Si:2/11/86 | 0.23 | 550 | 7,500 |
| No. 3 | P$_2$/Al$_2$/Si:11/1/85 | 0.15 | 3,000 | 28,000 |
| No. 4 | P$_2$/Al$_2$/Si:53/9/0 | 0.14 | 1,000 | 90,000 |

Figure 7:
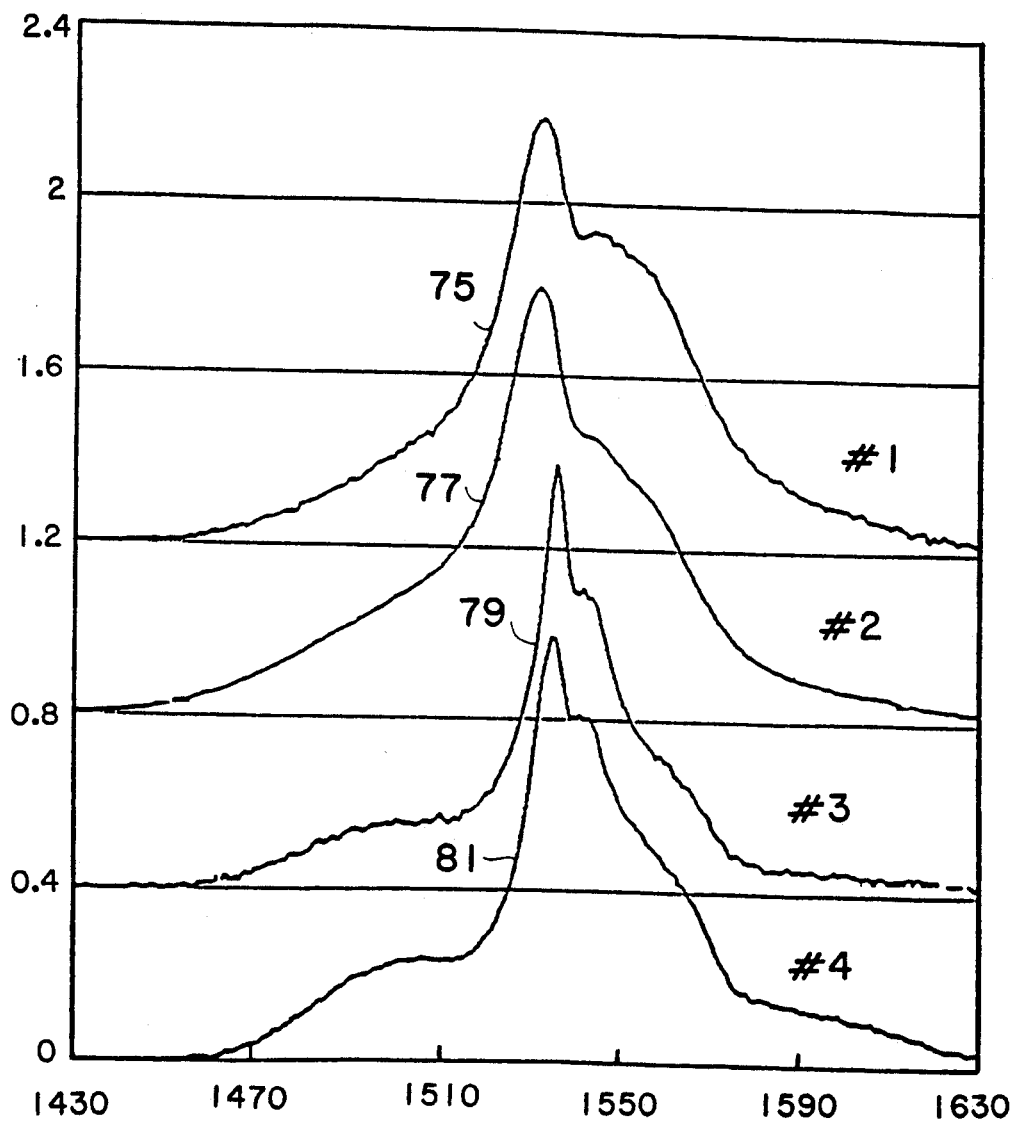
FIG. 7 is a graphical representation of the fluorescence spectra of four different optical fibers under 820 nm excitation.

The fluorescence spectra for fibers Nos. 1, 2, 3 and 4, measured under 820 nm excitation, are represented by lines 75, 77, 79 and 81, respectively, in FIG. 7. Fiber No. 1 is a silicic glass fiber that is not doped with a small amount of alumina and erbium, but not ytterbium or phosphate. Fiber No. 2 is a silicic glass fiber that is doped with a large amount of alumina, erbium and ytterbium, but not phosphate. Fiber No. 3 is a silicic glass fiber that is doped with phosphate, a small amount of alumina, erbium and ytterbium. Fiber No. 4 is a phosphatic glass fiber that is doped with a small amount of alumina, erbium and ytterbium, as described above.

It should be noted that the spectrum of fiber No. 1, as represented by line 75, is nearly identical to that of fiber No. 2, as represented by line 77, indicating that the emission spectrum is independent of the presence of ytterbium. Fluorescence from the phosphatic glass fiber No. 4 is significantly narrower and shifter to longer wavelengths compared to that of fibers No. 1 and No. 2. The emission spectrum of the phosphate-doped silicic fiber No. 3 is nearly identical to that of the fiber No. 4, although the linewidth is in fact slightly narrower. The spectral narrowing is attributed to a reduced site-to-site variation in fiber No. 3. The heavily alumina-doped fiber No. 2 appears to have lost the spectral characteristics of the phosphate-doped fiber No. 3.

According to the preferred embodiment, the phosphate-doped silicic fiber according to the invention comprises a concentration of erbium ions in the range of 100 to 10,000 ppm, ideally in the range of 500 to 5,000 ppm, with a preferred value of approximately 1,000 ppm. The preferred ytterbium ion concentration is in the range of 1,000 to 100,000 ppm, ideally in the range of 3,000 to 50,000 ppm, with a preferred value of 30,000 ppm. These values are based upon measurements determined by SEM/EDX analysis.

The preferred concentration of phosphate is in the range of 2 to 25 mole percent, ideally in the range of 5 to 15 mole percent, with a preferred value of 10 mole percent. The concentration of alumina is preferably no more than approximately 5 mole percent, and ideally no more than 3 mole percent, with less than 1 mole percent preferred.

It is also useful to describe the composition of this fiber in terms of the value of several different indicators that are directly controlled by the dopant concentrations. The fibers may thus be fabricated according to the invention by changing the composition of the fibers to change measured values of the indicators to be within preferred ranges. This is a particularly useful way to optimize the dopant concentrations in the fiber compositions when the empirical determination of these concentrations is difficult or uncertain. One of these indicators comprises the rise time of the energy transfer to the metastable $^4I_{13/2}$ quantum level of Er$^{3+}$ from the $^2F_{5/2}$ quantum level of Yb$^{3+}$. According to the invention, this rise time is preferably in the range of 0 to 60 microseconds, ideally in the range of 0 to 30 microseconds.

Another indicator is the rate of decay time of Yb$^{3+}$ from the $^2F_{5/2}$ to the $^2F_{7/2}$ quantum level as caused ytterbium to erbium energy transfer, with more rapid initial rates of the ytterbium decay signifying more efficient ytterbium-erbium energy transfer. This is graphically illustrated in FIG. 8, wherein line 83, line 85 and line 87 represent different decay times of ytterbium decay for different compositions of fiber.

Line 83 corresponds to a fiber that has no concentration of erbium, so that there is no energy transfer from ytterbium to erbium in this case. Line 85 corresponds to a fiber that has suitable concentrations of erbium, ytterbium and phosphate to promote good Yb$^{3+}$ to Er$^{3+}$ energy transfer. In this case, the slope of the line 85 is much more steep than the slope of the line 83, thus indicating rapid and efficient energy transfer.

Line 87 corresponds to a fiber that has good concentrations of erbium, ytterbium and phosphate for efficient energy transfer, but also has a relatively high concentration of alumina as well. The high concentration of alumina interferes with the Yb$^{3+}$ to Er$^{3+}$ energy transfer, and thus it has a slope with a steepness that is intermediate the lines 83 and 85. This rate of decay is preferably at least 40 microseconds, and ideally at least 10 microseconds.

Efficient ytterbium to erbium energy transfer requires that the forward transfer rate and decay be fast compared to the erbium to ytterbium back transfer rate. Efficient ytterbium to erbium energy transfer is also dependent upon the wavelength of the pumping radiation, as explained in detail below in connection with the ytterbium absorption spectrum.

Still another indicator is the decay time of the metastable $^4I_{13/2}$ quantum level of Er$^{3+}$. This indicator represents the influence of the dopants upon the ability of the fiber to radiate energy in proportion to the transfer the energy from the $^2F_{5/2}$ quantum level of Yb$^{3+}$.

Although the ytterbium ions in the optical fibers have a broad absorption spectrum over which they can be exited according to the invention with pump radiation, extending from approximately 800 nm 1100 nm with a peak at approximately 960 nm, it has been discovered that the longer wavelengths of the ytterbium absorption spectrum are far more effective for transferring energy to the erbium ions.

This is because the pumping radiation tends to cause the ytterbium ions to undergo stimulated emission at wavelengths longer than the wavelength of the pumping radiation. The stimulated emission always occurs over a range of frequencies that are longer than that of the pumping radiation, because conservation of energy must be maintained, the energy transferred from the pumping radiation to the ytterbium ions is less than 100 percent, and the shorter wavelength stimulated emission is less probable due to this inefficiency.

When the pumping radiation has a wavelength that is on the shorter wavelength side of the ytterbium absorption spectrum, for instance, in the range of 800 nm to 950 nm, the stimulated ytterbium emission will be over a wider range of frequencies, thus causing even more stimulated emission instead of ytterbium to erbium energy transfer. When the pumping radiation is on the longer wavelength side of the ytterbium absorption spectrum, the wavelengths of any stimulated emission are too long to be efficiently absorbed by the ytterbium. Since less energy is released as stimulated emission, greater non-radiative transfer of energy from the $^2F_{5/2}$ state of ytterbium to the $^4I_{11/2}$ state of erbium occurs.

Thus, the longer pumping wavelengths, such as in the range of 980 nm to 1080 nm, or ideally in the range of 1030 nm to 1070 nm, are more effective in exciting the ytterbium ions so that they excite the erbium ions without producing radiation themselves. Shorter wavelengths, such as in the range of approximately 820 nm to 950 nm, have been observed to cause the ytterbium ions to release much of their energy in stimulated emission without efficiently transferring energy to the erbium ions.

In addition to the foregoing, Er/Yb co-doped borosilicates may also have sufficient Er/Yb energy transfer process to make them suitable host materials. Borates have higher multi-phonon decay rates than phosphates and should, therefore, lead to a short $^4I_{11/2}$ lifetime in $Er^{3+}$. However, the addition of the borate $B_2O_3$ to silicic glass lowers the index of refraction so the cladding glass would have to be highly doped with $B_2O_3$ or fluorine in order to lower the index of refraction sufficiently. It was noted in E. R. Taylor et al., *Mat. Res. Soc. Symp.*, Vol. 172 p. 321, 1990, that an 80% mole percent borate glass quenches the lifetime of the erbium $^4I_{13/2}$ metastable state to 280 microseconds. For amplifier applications, the lifetime of the $^4I_{13/2}$ state must be much longer in order to achieve significant gain. Use of a lower amount of $B_2O_3$ in the glass may be useful, however. Recently, spectroscopic results were reported on a neodymium-doped borophosphate laser glass (S. Jiang et al., *CLEO* 1990 *Proceedings*, Anaheim, Calif.). This glass showed improved properties over both pure phosphatic and boracic glasses. Perhaps a silicic glass doped with both $P_2O_5$ would be optimum for the Yb-to-Er energy transfer system. The addition of $P_2O_5$ to silicic glass raises the index of refraction while $B_2O_3$ lowers it, thereby giving good control over the index of the core material.

As an alternative to sensitizing an $Er^{3+}$-doped fiber with $Yb^{3+}$, iron ($Fe^{2+}$ or $Fe^{3+}$) may also lead to an efficient transfer of energy to $Er^{3+}$. $Fe^{2+}$ and $Fe^{3+}$ have broad absorption bands in the near infrared that can be pumped with the output of diode-pumped Nd lasers in accordance with the invention. The oxidation state of Fe is not easily controlled during optical fiber fabrication, but either one of the oxidation states $Fe^{2+}$ or $Fe^{3+}$ should work. The Fe sensitized erbium fiber could be fabricated in a silicic glass fiber, rather than in a phosphatic glass fiber, which should make fusion splicing into an existing silicic glass optical fiber system straightforward. We have observed erbium fluorescence when pumping an Fe/Er co-doped fiber at 1.064 microns, a wavelength where only the sensitizer Fe has a finite absorption. The fluorescence indicates energy transfer is occurring from $Fe^{2+}$ or $Fe^{3+}$ to $Er^{3+}$. Sensitization by other transition metals, such as $Cr^{4+}$, is also a possibility.

An even broader range of sensitizers are available if ions that sensitize $Yb^{3+}$, such as $Nd^{3+}$ or $Cr^{3+}$, are considered. It has been shown, (for example, by J. G. Edwards and J. N. Sandoe J. Phys. D: Appl. Phys, 7 1078–1095, 1974) that transfer from $Nd^{3+}$ to $Yb^{3+}$ is very efficient even with relatively small $Nd^{3+}$ concentrations ($\sim 10^{19}$ cm$^{-3}$) if large $Yb^{3+}$ concentrations ($\sim 10^{21}$ cm$^{-3}$) are used. Furthermore, undesirable interactions between $Nd^{3+}$ and $Er^{3+}$ can be minimized if the $Nd^{3+}$ and $Er^{3+}$ concentrations are both small ($\sim 10^{19}$ cm$^{-3}$). A three-ion sensitizations process ($Nd^{3+}$, $Yb^{3+}$, $Er^{3+}$) can be used in glasses where the $Yb^{3+}$, $Er^{3+}$ transfer is efficient (e.g., phosphatic glass). This is potentially important because it may allow efficient pumping of fiber amplifiers with readily-available 800 nm laser diodes. With equal concentrations of $Nd^{3+}$ and $Er^{3+}$, the $Nd^{3+}$ ground-state absorption is much larger than either the ground or excited state $Er^{3+}$ absorption. Moreover, $Er^{3+}$ ESA should not limit the pump efficiency as it does with direct pumping of $Er^{3+}$. This approach would not be feasible in conventional silicic glass fiber because of the inefficient $Yb^{3+}/Er^{3+}$ transfer.

Figure 4:
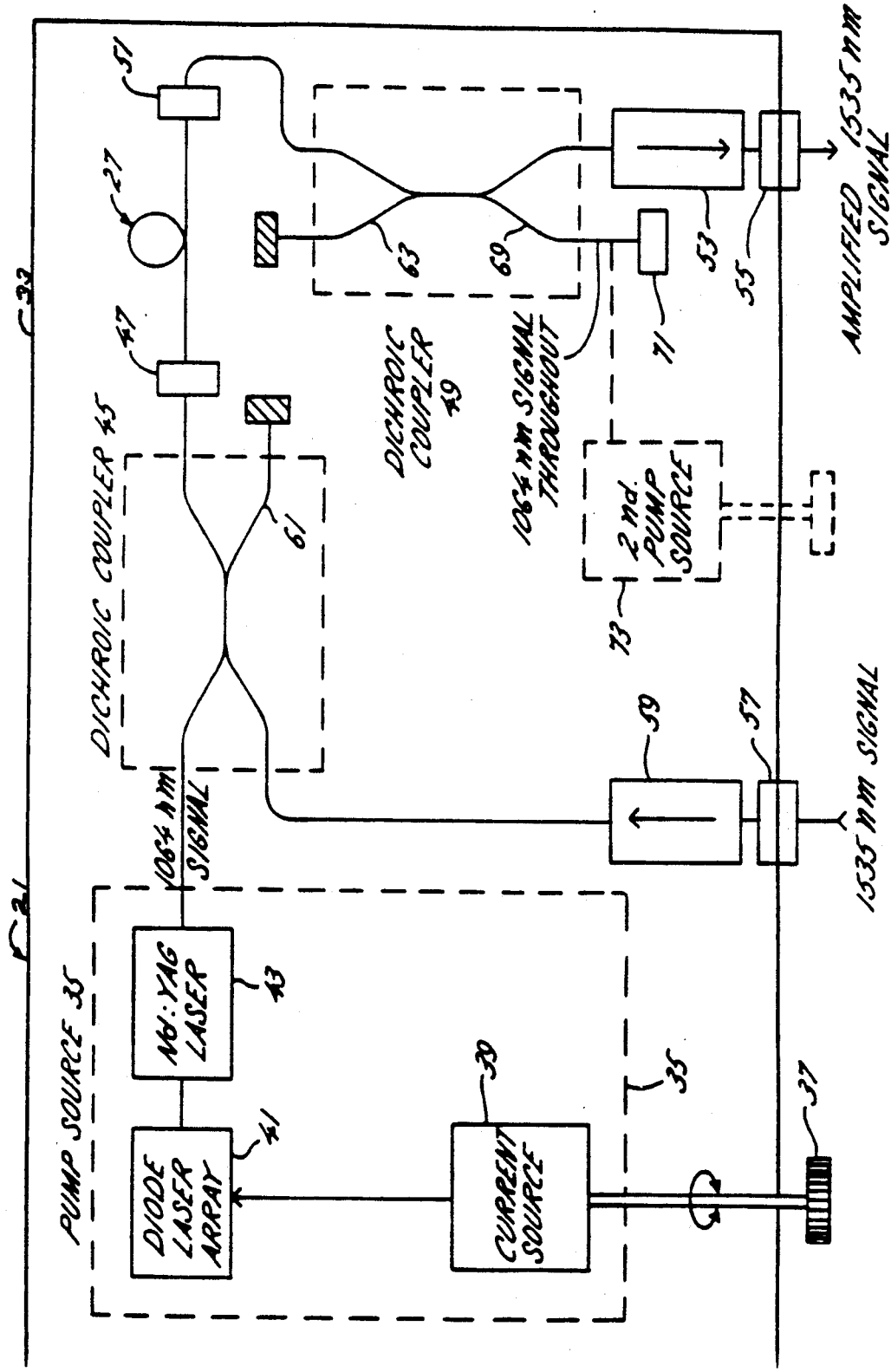
FIG. 4 is a schematic diagram of one of the optical amplifiers in FIG. 1.

In an optical amplifier 21 according to the invention illustrated in FIG. 4, the $Er^{3+}/Yb^{3+}$ fiber 27 according to the invention is approximately 80–130 centimeters long at a concentration of $Er^{3+}$ of 0.5 percent by weight. The fiber 27 is wrapped loosely in a coiled configuration so that it more easily fits into a housing 33 shown as a solid line about the perimeter of the amplifier 25. For a pump source, a model 1064-350P diode-pumped Nd:YAG laser 35 manufactured by Amoco Laser Company of Naperville, Ill., was modified to include a control knob 37 accessible from the outside of the housing 33. The knob 37 provides an external control of the source 39 of drive current for a laser diode array 41 of the pump source 35.

In keeping with the invention, the laser diode array 41 is efficiently coupled to a Nd:YAG laser 43 so that a relatively high percentage of the energy contained in the incoherent multimode light from the array is converted to coherent single mode light emanating from the Nd:YAG laser 43. The laser diode array 41 pumps the Nd:YAG laser 43 in the manner set forth in U.S. Pat. No. 4,710,940, which is herein incorporated by reference. The Nd:YAG laser 43 outputs a single-mode light signal at a characteristic frequency of 1064 nm. Other diode-pumped $Nd^{3+}$ doped crystal or glass lasers may also be utilized as pump sources.

The higher pump intensities in the co-doped fiber relative to direct diode-pumped erbium fibers ensure a high degree of inversion of the erbium and hence a low noise figure. This intense pumping may be especially important at high input signal powers (i.e., power amplifier performance), which is the preferred mode of this invention. Specifically, these higher levels of pump power, compared to direct diode-pumped amplifiers, present at the signal entry end of the amplifier ensure a high-level of saturation in the erbium thereby exhibiting a nearly quantum-limited noise figure. Intense pumping of a sensitizer, which is typically present in the ratio of 4 to 80:1 referenced to erbium, ideally within the ratios of approximately 4 to 20:1, and preferably in the ratio of approximately 10:1, also ensures a high degree of saturation under all operating conditions (i.e., signal input powers). Pumping through a sensitizer network can also have advantages with regards to damping of pump-power fluctuations and reducing transient gain saturation and crosstalk effects.

The Nd:YAG laser 43 of the pump source 35 is directly fiber coupled or "pigtailed" to a wavelength division multiplexing (WDM) or dichroic fiber optic coupler 45, such as a model (980/1550-COX-MX-01X02-01), manufactured by Gould Inc. of Glen Burnie, Md. The output of the coupler 45 and the input to the fiber are terminated by a conventional means for coupling fibers. The means 47 comprises standard ST-PC ceramic ferrules aligned in a pair of low expansion metal disks fabricated from a material such as Invar and made at Amoco Laser Co. Also, if the fiber 27 comprises phosphatic glass, an ultraviolet curing epoxy of intermediate index of refraction is placed between the dissimilar phosphatic glass and silicic glass fibers to enhance coupling and suppress backreflections lending to noise and/or lasing of the erbium-doped fiber. To achieve correct alignment, power throughput the fiber 27 is monitored while the alignment is made. The two disks are soldered to each other to maintain alignment between the amplifying fiber 27 and the coupler 45.

An alternative method of coupling the fibers is to enclose both of them in ceramic ferrules that are polished at an angle q sufficiently large to suppress back reflections. The angle q would be given by $$q > \sin^{-1}(N.A.)$$

where N.A. is the larger of the two numerical apertures of the two dissimilar fibers. The angled ferrules would also be contained in Invar disks and actively aligned. For either alignment method, the coupling process can be substantially simplified if the amplifying fiber is manufactured to the same concentricity and diameter tolerances as the coupler fiber.

At the output of the fiber 27, the fiber terminates into a Gould coupler 49 of the same type aligned with the input to the fiber. Alignment between the output of the fiber 27 and the coupler 49 is achieved in the same manner as with the input. Specifically, the input of the coupler 49 and the output of the fiber 27 are terminated by a conventional means 51 for coupling fiber comprising ST ceramic ferrules actively aligned in two Invar disks. The two Invar disks are soldered to maintain alignment between the fiber 27 and the coupler 49. As with the coupling 47, if the fiber 27 comprises phosphatic glass, the coupling 51 includes an ultraviolet curing epoxy of intermediate index of refraction for suppressing back reflections.

A polarization insensitive optical isolator 53 such as model number OTPISO15, manufactured by Gould Inc., Glen Burnie, Md. is fusion spliced to the 1535 nm output leg of the coupler 49. The output of the isolator 53 terminates into a conventional ST-PC single-mode connector 55 (0.15 dB loss and −45 dB back reflection). The fiber cable 21 or 23 in FIG. 1 carrying the 1535 signal to either of the amplifiers 25 is terminated at a conventional ST-PC connector 57, which in turn is connected to a isolator 59 of the same type as the isolator 53 at the output of the amplifier. In the couplers 45 and 49, the ends of the unused fiber legs 61 and 63 were melted in a fusion splicer to fabricate ball lenses 65 and 67 to prevent back reflections. The other leg 69 of the coupler 49 selectively throughputs the 1064 nm light from the fiber 27 so that it terminates into a non-reflecting metal block 71 of conventional construction.

Regarding the efficiency, output power and noise characteristics of the amplifier 25, there is an enhancement to the arrangement of the amplifier in FIG. 4 that may improve its performance. Since the $Er^{3+}/Yb^{3+}$ gain medium must be saturated in its three-quantum level amplifying system along the entire length of the fiber for the fiber to fully amplify the 1535 nm signal, significant power levels of the pump light at 1064 nm will exist at the output of the fiber. However, the amount of excess pump light needed at the exiting end of the amplifier fiber 27 to ensure Er saturation is less than that needed for direct pumping of Er. If significant levels of the pump power exit at the output of the fiber 27, it may be desirable to place at the end of the leg 69 in the coupler 49 a mirror (not shown) that is highly reflective at the pump wavelengths of approximately 1064 nm. In this fashion, the excess 1064 nm pump light is afforded a second pass through the fiber 27, thereby improving system gain, output power and medium inversion, all of which improve noise performance.

As an alternative to the addition of a mirror at the end of the leg 69 of the coupler 49, a second pump source 73 shown in dashed lines in FIG. 4 may be added to the amplifier at the end of the leg 69. In this manner, the fiber 27 is bi-directionally pumped by the pump source 35 and the second pump source 73. The second pump source 73 is preferably of the same type as the pump source 35. In this alternative configuration of the amplifier 27, the pump sources 35 and 73 may require isolators at their outputs such as the isolators 53 and 59. The isolators will prevent feedback effects from developing in the pump sources as a result of the bi-directional pumping. The higher pump energy in this configuration will lead to a longer optimum value for the length of the fiber 27. This will in turn lead to increased pump absorption and possibly minimize feedback effects.

Alternatively, the second pump source could be another $Nd^{3+}$ doped crystal such as YLF with a characteristic emission at either 1047 or 1053 nm. In this fashion, the two pump wavelengths will not overlap in frequency and therefore will not cause feedback induced instabilities in the laser pump sources.

Turning to the graphs and FIGS. 5 and 6, we have built and tested a prototype amplifier as described in connection with FIGS. 3 and 4. Various different fabrications of the erbium fiber 27 have been substituted into the amplifier in order to achieve the best performance characteristics. The data in FIGS. 5 and 6 reflect the latest and best system results achieved. The fiber providing the best performance had a numerical aperture of 0.14 microns and a core diameter of 4.9 microns. It was fabricated as described in connection with FIG. 3 and its constituents were approximately 0.5 percent $Er^{3+}$ by weight and 12 percent $Yb^{3+}$ by weight.

For an input signal having a power of approximately 1.5 microwatts (−28 dBm), we observed a signal gain of 34.5 dB (i.e., an amplification of approximately 2,800) at an absorbed pump power of 120 milliwatts. To collect the data points for the graph of FIG. 5, the input signal was held at 1.5 microwatts and the pump power was varied from about 40 milliwatts to 210 milliwatts. As can be seen from the data in FIG. 5, the absorbed pump power varied from about 25 milliwatts to 120 milliwatts. From the device in FIG. 4, the absorbed pump power was determined by measurement of the pump power at the pump output coupler port 71, measurement of the coupling loss at points 47 and 51, and a knowledge of attenuation loss at the pump wavelength of the fiber 27.

Figure 5:
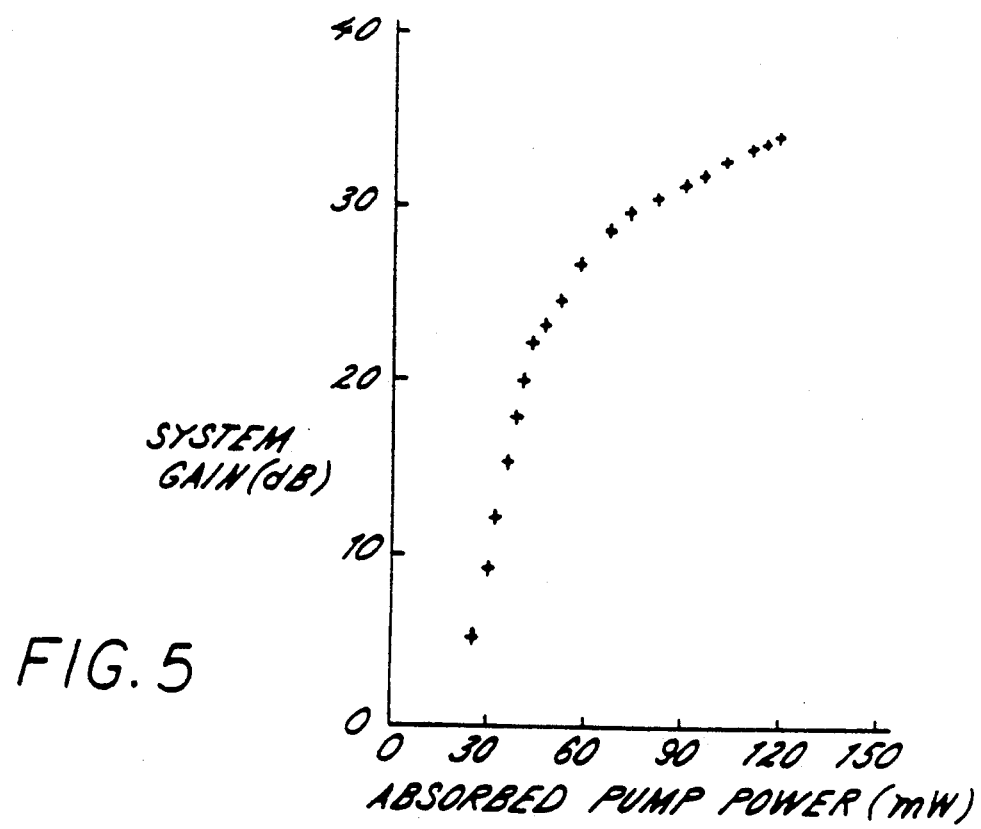
FIG. 5 is a graph of the small signal gain of the amplifier in FIG. 4 with respect to various levels of absorbed pump power.

To the best of our knowledge, the small signal gains plotted in the graph of FIG. 5 are as good as or better than those presently achieved from any erbium-doped fiber amplifier system utilizing a diode laser as an ultimate pump source. Moreover, these gains are realized at high levels of output power as evidenced by the data in FIG. 6.

Figure 6:
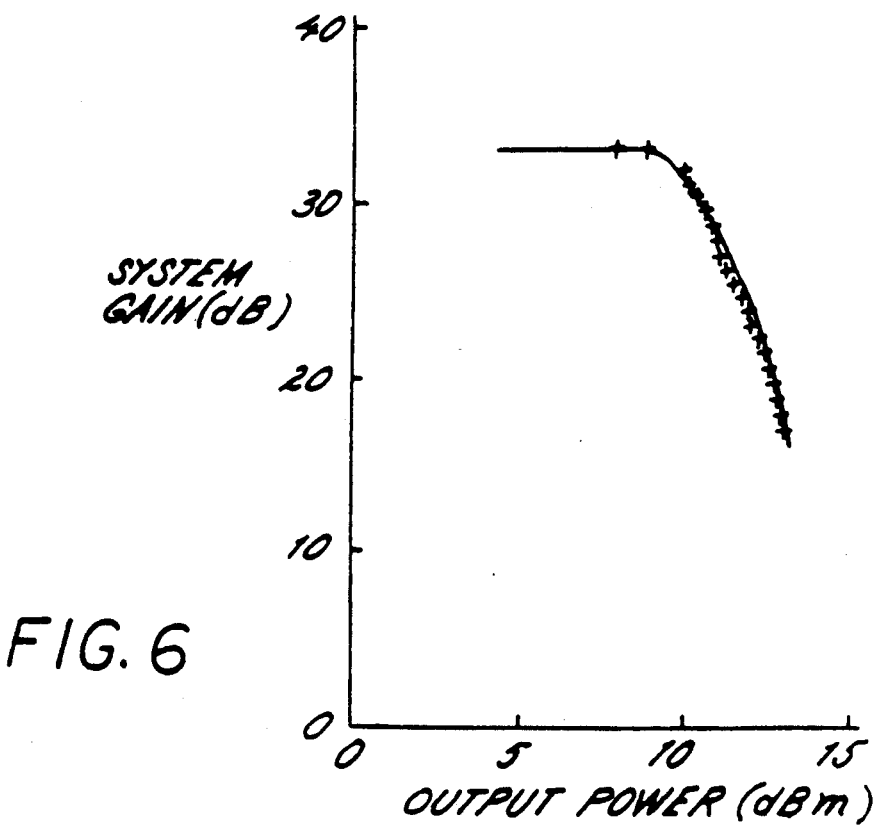
FIG. 6 is a graph of the gain of the amplifier in FIG. 4 with respect to the output power of the amplifier, illustrating the power saturation of the amplifier to be at approximately +10 dBm.

In this regard, the data of FIG. 6 were collected by maintaining the level of absorbed pump power at 140 milliwatts while varying the power of the input signal. Power saturation (i.e., decrease in gain of three dB) occurs at approximately an output power of fifteen (15) dBm for a 1480 pump source (ref: Masuo Suyama Snowmass). To the best of our knowledge, the high power and high gain performance evidenced by the data of FIGS. 5 and 6 cannot be equalled by known erbium fiber amplifiers utilizing single diode lasers as direct pump sources.

Both the small signal gain and power results of FIG. 6 are system results, meaning they are measured from the input signal at input connector 57 to the output signal at output connector 55. As the amplifying fiber 27 is not yet fully optimized with regards to core size, numerical aperture, and coupling method, there are large system coupling losses. For example, there is approximately a 4 dB loss in the input signal from the input connector 57 to the input end of the amplifying fiber at point 47. The loss is even slightly larger in going from the output end of the amplifier fiber at point 51 to the output connector 55. With improved fiber, coupling methods and 1064/1535 specific WDM couplers, we expect very large improvements in system performance.

In view of the foregoing, it can be seen that an erbium glass doped with a sensitizer and pumped by a neodymium laser rod that is in turn pumped by a laser diode array provides a high power and high gain optical amplifier for light in the 1.535 micron region. The amplifier maintains small signal gains comparable to the best of previous erbium fiber amplifier systems utilizing diode pump sources for achieving high output power levels. In this connection, the amplifier is ideal for high power applications such as illustrated herein. Examples of possible other applications are soliton pulse amplification and amplification of short pulse diodes for Optical Time Domain Reflectometry (OTDR) or rangefinding measurements.

Of course, the optical fiber according to the invention can be used for a source of radiation simply by adding positive feedback between the input and the output of the optical amplifier 21 as shown in FIG. 4. The positive feedback is easily provided with a suitable optical cavity that has a resonant wavelength close to the wavelength of the source output wavelength, as well known in the art.

In this connection, it will be evident to those skilled in the art that the optical fibers according to the invention are applicable to all types of sources, such as ring lasers, short pulse lasers, and so forth, and superluminescence sources, such as fiber gyros. Furthermore, the optical fibers according to the invention are ideal for use in optical detection amplifiers adapted for LIDAR and rangefinding applications, due to their low noise and high amplification.

Thus there has been described herein an improved optical fiber for use in optical fiber amplifiers and sources of all kinds that is efficiently pumped by a pump beam from a solid state laser source. It will be understood that various changes in the details, materials, steps and arrangements of parts that have been described and illustrated above in order to explain the nature of the invention may be made by those of ordinary skill in the art within the principle and scope of the present invention as expressed in the appended claims.

We claim:

1. A silicic optical fiber for use in optical amplifiers and sources, comprising:
    a concentration of erbium ions for providing radiation when the quantum energy level of said erbium ions decays from $^4I_{13/2}$ metastable state to the $^4I_{15/2}$ ground level state;
    a concentration of ytterbium ions for absorbing radiation as the quantum energy level of said ytterbium ions is excited from a thermally excited sub-level of the $^2F_{7/2}$ state to the $^2F_{5/2}$ metastable state and for exciting the quantum energy level of said erbium ions from the $^4I_{15/2}$ ground level state to the $^4I_{11/2}$ state when the quantum energy level of said ytterbium ions decays from the $^2F_{5/2}$ state back to the $^2F_{7/2}$ state; and
    a concentration of phosphate for reducing the decay time of the erbium ion quantum energy level from the $^4I_{11/2}$ state to the $^4I_{13/2}$ state to reduce back transfer of energy from said erbium ions to said ytterbium ions.

2. The optical fiber as set forth in claim 1, wherein said erbium ion concentration is in the range of 100 to 10,000 ppm.

3. The optical fiber as set forth in claim 2, wherein said erbium ion concentration is between approximately 500 to 5,000 ppm.

4. The optical fiber as set forth in claim 3, wherein said erbium ion concentration is approximately 1,000 ppm.

5. The optical fiber as set forth in claim 1, wherein said ytterbium ion concentration is in the range of 1,000 to 100,000 ppm.

6. The optical fiber as set forth in claim 5, wherein said ytterbium ion concentration is between approximately 3,000 and 50,000 ppm.

7. The optical fiber as set forth in claim 6, wherein said ytterbium ion concentration is approximately 30,000 ppm.

8. The optical fiber as set forth in claim 1, wherein said phosphate concentration is in the range of 2 to 25 mole percent.

9. The optical fiber as set forth in claim 8, wherein said phosphate concentration is between approximately 5 and 15 mole percent.

10. The optical fiber as set forth in claim 9, wherein said phosphate concentration is approximately 10 mole percent.

11. The optical fiber as set forth in claim 1, wherein the proportion of said ytterbium ions to said erbium ions is in the range of 4:1 to 80:1.

12. The optical fiber as set forth in claim 11, wherein the proportion of said ytterbium ions to said erbium ions is between approximately 4:1 and 20:1.

13. The optical fiber as set forth in claim 12, wherein the proportion of said ytterbium ions to said erbium ions is approximately 10:1.

14. The optical fiber as set forth in claim 1, wherein said fiber has no more than approximately 8 mole percent alumina.

15. The optical fiber as set forth in claim 14, wherein said fiber has less than approximately 5 mole percent concentration of alumina.

16. The optical fiber as set forth in claim 1, wherein said radiation absorbed by said ytterbium ions is in the range of 980 to 1080 nm.

17. The optical fiber as set forth in claim 16, wherein said radiation absorbed by said ytterbium ions is between approximately 1030 and 1070 nm.

18. The optical fiber as set forth in claim 17, wherein said radiation absorbed by said ytterbium ions is approximately 1064 nm.

19. The optical fiber as set forth in claim 1, wherein said radiation produced by said erbium ions is in the range of 1500 to 1650 nm.

20. The optical fiber as set forth in claim 19, wherein said radiation produced by said erbium ions is between approximately 1500 and 1580 nm.

21. The optical fiber as set forth in claim 20, wherein said radiation produced by said erbium ions is approximately 1535 nm.

22. The optical fiber as set forth in claim 1, wherein the transfer rate and decay time of the ytterbium to erbium energy transfer is much faster than the erbium to ytterbium transfer rate.

23. The optical fiber as set forth in claim 22, wherein said decay time of the erbium ion quantum energy level from the $^4I_{11/2}$ state to the $^4I_{13/2}$ state is in the range of 0 to 5 microseconds.

24. The optical fiber as set forth in claim 23, wherein said decay time of the erbium ion quantum energy level from the $^4I_{11/2}$ state to the $^4I_{13/2}$ state is between approximately 0 to 3 microseconds.

25. The optical fiber as set forth in claim 24, wherein said decay time of the erbium ion quantum energy level from the $^4I_{11/2}$ state to the $^4I_{13/2}$ state is approximately 2 microseconds.

26. The optical fiber as set forth in claim 22, wherein the decay time of the ytterbium ion quantum energy level from the $^2F_{5/2}$ state to the $^2F_{7/2}$ state is not more than approximately 150 microseconds.

27. The optical fiber as set forth in claim 1, wherein the rise time of the energy transfer from the $^2F_{5/2}$ state of the ytterbium ion quantum energy level to the $^4I_{13/2}$ state of the erbium ion quantum energy level is in the range of 5 to 60 microseconds.

28. The optical fiber as set forth in claim 1, wherein the rise time of the energy transfer from the $^2F_{5/2}$ state of the ytterbium ion quantum energy level to the $^4I_{13/2}$ state of the erbium ion quantum energy level is between approximately 0 and 30 microseconds.

29. The optical fiber as set forth in claim 1, wherein the rise time of the energy transfer from the $^2F_{5/2}$ state of the ytterbium ion quantum energy level to the $^4I_{13/2}$ state of the erbium ion quantum energy level is approximately 20 microseconds.

30. A silica optical fiber for use in optical amplifiers and sources, comprising:
   a concentration of erbium ions in the range of 100 to 10,000 ppm for providing radiation when the quantum energy level of said erbium ions decays from the $^4I_{13/2}$ metastable state to the $^4I_{15/2}$ ground level state;
   a concentration of ytterbium ions in the range of 1,000 to 100,000 for absorbing radiation as the quantum energy level of said ytterbium ions is excited from a thermally excited sub-level of the $^2F_{7/2}$ state to the $^2F_{5/2}$ metastable state and for exciting the quantum energy level of said erbium ions from the $^4I_{15/2}$ ground level state to the $^4I_{11/2}$ state when the quantum energy level of said ytterbium ions decays from the $^2F_{5/2}$ state back to the $^2F_{7/2}$ state; and
   a concentration of phosphate In the range of 2 to 25 mole percent for reducing the decay time of the erbium ion quantum energy level from the $^4I_{11/2}$ state to the $^4I_{13/2}$ state to reduce back transfer of energy from said erbium ions to said ytterbium ions.

31. The optical fiber as set forth in claim 30, wherein the proportion of said ytterbium ions to said erbium ions is in the range of 4:1 to 80:1.

32. The optical fiber as set forth in claim 30, wherein said fiber has no more than approximately 8 mole percent concentration of alumina.

33. The optical fiber as set forth in claim 30, wherein said radiation absorbed by said ytterbium ions is in the range of 980 to 1080 nm.

34. The optical fiber as set forth in claim 30, wherein said radiation produced by said erbium ions is in the range of 1500 to 1650 nm.

35. A silicic optical fiber for use in optical amplifiers and sources, comprising:
   a concentration of approximately 1,000 ppm erbium ions for providing radiation when the quantum energy level of said erbium ions decays from the $^4I_{13/2}$ metastable state to the $^4I_{15/2}$ ground level state;
   a concentration of approximately 30,000 ytterbium ions for absorbing radiation as the quantum energy level of said ytterbium ions is excited from a thermally excited sub-level of the $^2I_{7/2}$ state to the $^2F_{5/2}$ metastable state and for exciting the quantum energy level of said erbium ions from the $^4I_{15/2}$ ground level state to the $^4I_{11/2}$ state when the quantum energy level of said ytterbium ions decays from the $^2F_{5/2}$ state back to the $^2F_{7/2}$ state;
   a concentration of approximately 10 mole percent phosphate for reducing the decay time of the erbium ion quantum energy level from the $^4I_{11/2}$ state to the $^4I_{13/2}$ state to reduce back transfer of energy from said erbium ions to said ytterbium ions; and
   a concentration of alumina of no more than approximately 8 mole percent.

36. The optical fiber as set forth in claim 35, wherein said fiber has less than approximately 5 mole percent concentration of alumina.

37. The optical fiber as set forth in claim 35, wherein said radiation absorbed by said ytterbium ions is between approximately 1030 and 1070 nm.

38. The optical fiber as set forth in claim 37, wherein said radiation produced by said erbium ions is between approximately 1500 and 1580 nm.

39. A silicic optical fiber for use in optical amplifiers and sources, comprising:
   a concentration of approximately 1,000 ppm erbium ions for providing radiation in the range of approximately 1500 to 1580 nm when the quantum energy level of said erbium ions decays from the $^4I_{13/2}$ metastable state to the $^4I_{15/2}$ ground level state;
   a concentration of approximately 30,000 ppm ytterbium ions for absorbing radiation in the range of approximately 1030 to 1070 nm as the quantum energy level of said ytterbium ions is excited from a thermally excited sub-level of the $^2F_{7/2}$ state to the $^2F_{5/2}$ metastable state and for exciting the quantum energy level of said erbium ions from the $^4I_{15/2}$ ground level state to the $^4I_{11/2}$ state when the quantum energy level of said ytterbium ions decays from the $^2F_{5/2}$ state back to the $^2F_{7/2}$ state;
   a concentration of approximately 10 mole percent phosphate for reducing the decay time of the erbium ion quantum energy level from the $^4I_{11/2}$ state to the $^4I_{13/2}$ state to reduce back transfer of energy from said erbium ions to said ytterbium ions; and
   a concentration of no more than approximately 5 mole percent alumina for improving the transfer of energy from said ytterbium ions to said erbium ions.

* * * * *

(12) EX PARTE REEXAMINATION CERTIFICATE (6793rd)
United States Patent
Grubb et al.

(10) Number: US 5,225,925 C1
(45) Certificate Issued: May 5, 2009

(54) SENSITIZED ERBIUM FIBER OPTICAL AMPLIFIER AND SOURCE

(75) Inventors: Stephen G. Grubb, Naperville, IL (US); Douglas W. Anthon, Wheaton, IL (US); William L. Barnes, Basset (GB); Janet E. Townsend, Hamble (GB)

(73) Assignee: Scientific-Atlanta, Inc., Lawrenceville, GA (US)

Reexamination Request:
No. 90/007,524, Apr. 27, 2005

Reexamination Certificate for:
Patent No.: 5,225,925
Issued: Jul. 6, 1993
Appl. No.: 07/735,387
Filed: Jul. 24, 1991

Related U.S. Application Data

(63) Continuation-in-part of application No. 07/644,460, filed on Jan. 23, 1991, now abandoned.

(51) Int. Cl.
*H01S 3/17* (2006.01)
*H01S 3/06* (2006.01)
*H01S 3/067* (2006.01)
*H01S 3/0941* (2006.01)
*H01S 3/094* (2006.01)
*H04B 10/17* (2006.01)

(52) U.S. Cl. .................. 359/341.32; 359/343; 372/6
(58) Field of Classification Search .................. None
See application file for complete search history.

(56) References Cited

U.S. PATENT DOCUMENTS

| | | | | |
|---|---|---|---|---|
| 3,590,004 A | * | 6/1971 | Woodcock | 252/181.4 |
| 3,599,114 A | * | 8/1971 | Snitzer et al. | 372/40 |
| 4,015,217 A | | 3/1977 | Snitzer | 331/94.5 |
| 4,044,315 A | | 8/1977 | Snitzer | 331/94.5 |
| 4,653,056 A | | 3/1987 | Baer et al. | 372/27 |
| 4,701,929 A | | 10/1987 | Baer et al. | 372/71 |
| 4,710,940 A | | 12/1987 | Sipes | 372/75 |
| 4,780,877 A | | 10/1988 | Snitzer | 372/6 |
| 4,782,491 A | | 11/1988 | Snitzer | 372/6 |
| 4,815,079 A | | 3/1989 | Snitzer | 372/6 |
| 4,829,529 A | | 5/1989 | Kafka | 372/6 |
| 4,852,117 A | | 7/1989 | Po | 372/97 |
| 4,872,177 A | | 10/1989 | Baer et al. | 372/75 |
| 4,874,222 A | | 10/1989 | Vacha et al. | 350/96.34 |
| 4,923,279 A | * | 5/1990 | Ainslie et al. | 385/127 |
| 4,933,947 A | | 6/1990 | Anthon et al. | 372/34 |
| 4,938,556 A | * | 7/1990 | Digonnet et al. | 359/341.31 |
| 4,955,025 A | | 9/1990 | Mears et al. | 326/458 |
| 4,959,837 A | | 9/1990 | Fevrier et al. | 372/6 |
| 5,007,698 A | * | 4/1991 | Sasaki et al. | 398/181 |
| 5,039,631 A | * | 8/1991 | Krashkevich et al. | 501/64 |
| 5,231,465 A | * | 7/1993 | Huang et al. | 356/464 |

FOREIGN PATENT DOCUMENTS

EP 427320 * 5/1991

OTHER PUBLICATIONS

C.G. Atkins et al., "High–gain, broad spectral width erbium–doped fiber amplifier pumped near 1.5 μm", Electronics Letters, vol. 25, p. 910, Jul. 1989.*

(Continued)

*Primary Examiner*—Alan Diamond

(57) ABSTRACT

An optical fiber for amplifying or sourcing a light signal in a single transverse mode. The fiber comprises a host glass doped with erbium (Er) and a sensitizer such as ytterbium (Yb) or iron (Fe). Preferably the host glass is doped silicic glass (e.g., phosphate or borate doped). Electrical energy is provided to diode lasers that pump the Nd laser rod, which in turn pumps the fiber. Such a configuration for pumping the fiber provides a high energy transfer from the diodes to the Nd laser rod, which in turn enables high pumping powers to be coupled into the single-mode co-doped fiber. Based on the amplification characteristics of the co-doped fiber and the efficient coupling of power from the laser diodes, the amplifier provides power and small signal gains comparable to the best observed, while requiring only conventional and readily available diode-based pump sources.

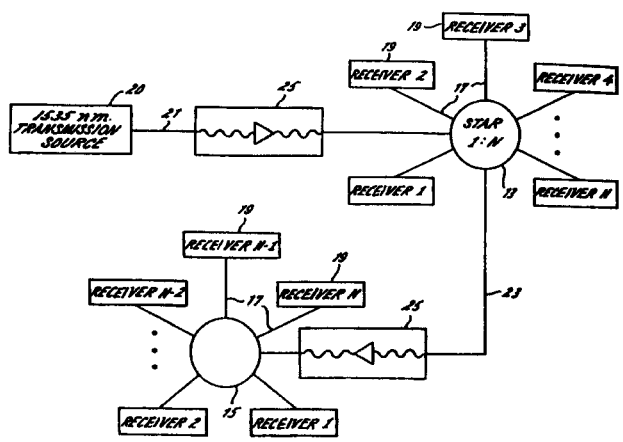

OTHER PUBLICATIONS

Stephen Grub, Physical Technology Division and Doug Anthon, Amoco Laser Company, Co–doped Erbium Fibers for Optical Amplifiers, No. 30424 (9 pages).*

Poole, "Fabrication of Al2O3 Co–Doped Fibres by a Solution–Doping Technique,"14th European Optical Communication, ECOC 88, vol. 1, Sep. 11–15, 1988, pp. 433–436.*

Sensitization of the Luminescence of Rare–Earth Ions by Trivalent Iron in Glasses—Journal of experimental and Theoretical Physics Letters—G.E. Malashkevich et al., vol. 47, No. 1, Jan. 10, 1998 p. 38–40.

Optimal Pumping of Erbium–Doped–Fibre Optical Amplifers—R.I. Laming et al., p. 25–28.

ER3+—Yb and Er 3+ Doped Fiber Lasers Journal of Lightwave Technology—W.L. Barns et al., vol. 7, No. 10 Oct. 1989—p. 343–345.

Multichannel AM–VSB Television Signal Transmission using an Erbium–Doped Optical Fiber Power Amplifier—W.I. Way et al., IEEE Photonics Technology Letters, vol. 2 No. 10, Oct. 1989 p. 343–345.

A High–Gain, High out–put Saturation Power Erbium–Doped Fiber Amplifier Pumped 532 nm—M.M. Choy et al., IEEE Photonices Technology Letters vol. 2 No. 1 Jan. 1990 p. 38–40.

Erbium Glass Lasers and their Applications—V.P. Gapontsev, et al., Optics & Laser Technology Aug. 1982 p. 189–196.

Optical Amplification—Robert Baker, Physics World, Mar. 1990 p. 41–44.

Impact of Erbium–Doped Amplifiers on Optical Communications Systems—Sadakuni Shimada, Optics & Photonics News Jan. 1990, p. 6–12.

Nd and Er–doped Phosphate Glass for Fiber Laser—T. Yamashita, SPIE vol. 1171 Fiber laser Sources & Amplifers 1989 pp. 291–297.

Efficient Pumping of Nd3+ Ions via Change Transfer Bands of Fe3+ Ions in YAG—M.V Korzhik et al., Soviet Journal of Quantum Electronics vol. 19, No. 3 Mar. 1989 p. 344–346.

High–Quantum–Efficiency Er3+ Fiber Lasers Pumped at 980 nm—W.L. Barnes et al., Optics Letters, vol. 14, No. 18 Sep. 15, 1989 p. 1002–1004.

1.56 μm Yb Sensitized Er Fibre Laser Pumped by Diode Pumped Nd:Yag & Nd: YLF Lasers, Electronics Letters vol. 24 No. 18 p. 1160–1161, Sep. 1988.

Diode Laser Pumped Er3+/Yb3+ Doped Fiber Lser Operating at 1.57 μm—W.L. Barnes et al., Proceedings of OFC 1989 Houston Feb. 1989, 1898 Technical Diges Series, TUG4.

Special and Other Properiteis of Neodynmim Boroposphate Laser Glasses—Shibin Jiamg & Yasi Jiang, CLEO Proceedings, Anaheim,May 21–25, 1990, 1990 Technical Diges Series vol. 7 Paper CMG 2 p. 28.

A 1.54 μm Er Glass Laser Pumped by a 1.064 μm Nd: YAG Laser—DC Hanna et al, Optics Communications vol. 63, No. 6 Sep. 15, 1987 p. 417–420.

Erbium–Doped Fibers Tomorrows Repeaters, Laser & Optronics, May 1990 p. 55–63.

Nd–and Er–doped Phosphate Glass Fiber Lasers—Tsukasa Yamashitia et al., CLEO Proceedings , Anaheim Apr. 25–29, 1988 Technical Digest vol. 7 Paper THHE p. 320.

Review of Fiber Laser Research in the U.K—D.C Hanna, CLEO Proceedings Anaheim, Apr. 25–29, 1998 Technical Digest, vol. 7 Paper THH3 p. 320.

Gain and Excited–State Absorption in Neodymium–Doped Optical Fiber Lasers—P.R. Morket et al, CLEO Proceedings—Anaheim Apr. 25, 1988 Technical Diges vol. 7 Paper THH4 p. 320.

Co–doped Erbium Fibers for Optical Amplifiers—Stephen Grubb & Doug Anthon, p. 1–11.

Rare Earth Doped Fibre Lasers and Amplifiers—D.N Payne & L. Reekie, Procedings of ECOC 1988 Brighton p. 49–52.

Stimulated Emission from Laser Pumped Ytterbium and Erbium Actived Glasses—E.I Gallant et al, Soviet Journal of Quantum Electroncis vol. 6 No. 10 Oct. 1976 p. 1190–1195.

Bulletin entitled—Schott Laser Glass. Modern Glass Telenology for Peak Performance, Schott Glass Technologies p. 1–11.

A. Righetti et al.; *Transmission Experiment Using a Directly–Modulated 1536 nm DFB Laser with Two Er–Doped Fibre Amplifiers and Clock Recovery;* Electronic Letters; Mar. 1990; pp. 330–332; vol. 26, No. 5.

S.G. Grubb et al.; *Diode–Pumped 1–36 μm Nd–Doped Fibre Laser;* Electronic Letters; Jan. 1990; pp. 121–122; vol. 26, No. 2.

F. Hakimi et al.; *Glass fiber laser at 1.36 μm from $SiO_2$:Nd;* Optical Letters; Oct. 1989; pp. 1060–1061; vol. 14, No. 19; Optical Society of America.

C. B. Layne et al.; *Multiphonun Relocation of Rare–Earth Ions in Oxide Glasses;* Dec. 1976; Physical Review B; 38 pages.

E.R. Taylor et al.; *Application–Specific piteal Fibres Manufactured from Multicomponent Glasses;* Materials Research Society Symp. Proceedings; 1990; pp. 321–327; vol. 172.

Amano et al.; *Lasting Characteristics of Nd: Phosphate Glass Fiber Laser;* HOYA Corporation; 1987; The British Library—"The world's knowledge", pp. 33–36. Presented at the ECOC Fiber Conference, Helsinki, Finland (1987).

Active Mode–Locking of AN Yb : Er Fibre Laser, Author: Hanna et al., Electronics Letter Jan. 19, 1989—vol. 25 No. 2, pp. 95–96.

Characterisation Techniques for Special Optical Fibres, Author: Martin Emanuel Fermann, British Thesis Library Sep. 1988, pp. 1–174.

Efficient Operation of AN Yb–Sensitised Er Fibre Laser at 1.56, Author: Frmann et al., Electronics Letter Sep. 1, 1988 vol. 24 No. 18, pp. 1135–1136.

Efficient Operation of AN Yb–Sensitised Er Fibre Laser Pumped in 0.8 Region, Author: Hanna et al., Electronics Letter Aug. 18, 1988 vol. 24 No. 17, pp. 1068–1069.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 12, before line 36:

*Furthermore, for the fibers of the invention, the decay time of the erbium ion quantum energy level from the $^4I_{11/2}$ state to the $^4I_{13/2}$ state is in the range of 0 to 5 microseconds. Ideally, the decay time of the erbium ion quantum energy level from the $^4I_{11/2}$ state to the $^4I_{13/2}$ state is 0 to 3 microseconds, with approximately 2 microseconds being preferred.*

AS A RESULT OF REEXAMINATION, IT HAS BEEN DETERMINED THAT:

The patentability of claim 39 is confirmed.

Claims 8, 22 and 27–29 are cancelled.

Claims 1, 9, 10, 23, 24, 26, 30 and 35 are determined to be patentable as amended.

Claims 2–7, 11–21, 25, 31–34 and 36–38, dependent on an amended claim, are determined to be patentable.

New claims 40–50 are added and determined to be patentable.

1. A silicic optical fiber for use in optical amplifiers and sources, comprising:
   a concentration of erbium ions for providing radiation when the quantum energy level of said erbium ions decays from $^4I_{13/2}$ metastable state to the $^4I_{15/2}$ ground level state;
   a concentration of ytterbium ions for absorbing radiation as the quantum energy level of said ytterbium ions is excited from a thermally excited sub-level of the $^2F_{7/2}$ state to the $^2F_{5/2}$ metastable state and for exciting the quantum energy level of said erbium ions from the $^4I_{15/2}$ ground level state to the $^4I_{11/2}$ state when the quantum energy level of said ytterbium ions decays from the $^2F_{5/2}$ state back to the $^2F_{7/2}$ state; and
   a concentration of phosphate for reducing the decay time of the erbium ion quantum energy level from the $^4I_{11/2}$ state to the $^4I_{13/2}$ state to reduce back transfer of energy from said erbium ions to said ytterbium ions, *wherein said phosphate concentration is in the range of approximately 10 mole percent to 25 mole percent.*

9. The optical fiber as set forth in claim [8] *1*, wherein said phosphate concentration is between approximately [5 and 15 mole percent] *11–20 mole percent.*

10. The optical fiber as set forth in claim 9, wherein said phosphate concentration is approximately [10 mole percent] *15 mole percent.*

23. The optical fiber as set forth in claim [22] *1*, wherein said decay time of the erbium ion quantum energy level from the $^4I_{11/2}$ state to the $^4I_{13/2}$ state is in the range of *greater than* 0 to 5 microseconds.

24. The optical fiber as set forth in claim 23, wherein said decay time of the erbium ion quantum energy level from the $^4I_{11/2}$ state to the $^4I_{13/2}$ state is *greater than* 0 to 3 microseconds.

26. The optical fiber as set forth in claim [22] *1*, wherein the decay time of the ytterbium ion quantum energy level from the $^2F_{5/2}$ state to the $^2F_{7/2}$ state is not more than [approximately] 150 microseconds.

30. A silica optical fiber for use in optical amplifiers and sources, comprising:
   a concentration of erbium ions in the range of 100 to 10,000 ppm for providing radiation when the quantum energy level of said erbium ions decays from the $^4I_{13/2}$ metastable state to the $^4I_{15/2}$ ground level state;
   a concentration of ytterbium ions in the range of 1,000 to 100,000 *ppm* for absorbing radiation as the quantum energy level of said ytterbium ions is excited from a thermally excited sub-level of the $^2F_{7/2}$ state to the $^2F_{5/2}$ metastable state and for exciting the quantum energy level of said erbium ions from the $^4I_{15/2}$ ground level state to the $^4I_{11/2}$ state when the quantum energy level of said ytterbium ions decays from the $^2F_{5/2}$ state back to the $^2F_{7/2}$ state; and
   a concentration of phosphate in the range of [2 to 25 mole percent] *approximately 10 mole percent to 25 mole percent* for reducing the decay time of the erbium ion quantum energy level from the $^4I_{11/2}$ state to the $^4I_{13/2}$ state to reduce back transfer of energy from said erbium ions to said ytterbium ions.

35. A silicic optical fiber for use in optical amplifiers and sources, comprising:
   a concentration of approximately 1,000 ppm erbium ions for providing radiation when the quantum energy level of said erbium ions decays from the $^4I_{13/2}$ metastable state to the $^4I_{15/2}$ ground level state;
   a concentration of approximately 30,000 *ppm* ytterbium ions for absorbing radiation as the quantum energy level of said ytterbium ions is excited from a thermally excited sub-level of the $^2I_{7/2}$ state to the $^2F_{5/2}$ metastable state and for exciting the quantum energy level of said erbium ions from the $^4I_{15/2}$ ground level state to the $^4I_{11/2}$ state when the quantum energy level of said ytterbium ions decays from the $^2F_{5/2}$ state back to the $^2F_{7/2}$ state;
   a concentration of approximately 10 mole percent phosphate for reducing the decay time of the erbium ion quantum energy level from the $^4I_{11/2}$ state to the $^4I_{13/2}$ state to reduce back transfer of energy from said erbium ions to said ytterbium ions; and
   a concentration of alumina of no more than approximately 8 mole percent.

*40. The optical fiber as set forth in claim 1, wherein the proportion of said ytterbium ions to said erbium ions is in the range of 25:1 to 80:1.*

*41. The optical fiber as set forth in claim 1, wherein the rise time of the energy transfer from the $^2F_{5/2}$ state of the ytterbium ion quantum energy level to the $^4I_{13/2}$ state of the erbium ion quantum energy level is in the range of 5 to 60 microseconds.*

*42. The optical fiber as set forth in claim 1, wherein the rise time of the energy transfer from the $^2F_{5/2}$ state of the ytterbium ion quantum energy level to the $^4I_{13/2}$ state of the* erbium ion quantum energy level is between greater than 0 and 30 microseconds.

43. The optical fiber as set forth in claim 1, wherein the rise time of the energy transfer from the $^2F_{5/2}$ state of the ytterbium ion quantum energy level to the $^4I_{13/2}$ state of the erbium ion quantum energy level is approximately 20 microseconds.

44. The optical fiber as set forth in claim 1, wherein said phosphate concentration is in the range of 10 mole percent to 25 mole percent.

45. The optical fiber as set forth in claim 1, wherein said phosphate concentration is between 11–20 mole percent.

46. The optical fiber as set forth in claim 1, wherein said fiber has less than 4 mole percent alumina.

47. The optical fiber as set forth in claim 1, wherein said fiber has less than 3 mole percent alumina.

48. The optical fiber as set forth in claim 1, wherein said fiber has less than 1 mole percent alumina.

49. A silicic optical fiber for use in optical amplifiers and sources, comprising:

a concentration of erbium ions for providing radiation when the quantum energy level of said erbium ions decays from $^4I_{13/2}$ metastable state to the $^4I_{15/2}$ ground level state;

a concentration of ytterbium ions for absorbing radiation as the quantum energy level of said ytterbium ions is excited from a thermally excited sub-level of the $^2F_{7/2}$ state to the $^2F_{5/2}$ metastable state and for exciting the quantum energy level of said erbium ions from the $^4I_{15/2}$ ground level state to the $^4I_{11/2}$ state when the quantum energy level of said ytterbium ions decays from the $^2F_{5/2}$ state back to the $^2F_{7/2}$ state; and a concentration of phosphate for reducing the decay time of the erbium ion quantum energy level from the $^4I_{11/2}$ state to the $^4I_{13/2}$ state to reduce back transfer of energy from said erbium ions to said ytterbium ions, wherein said fiber has less than 4 mole percent alumina, and wherein said phosphate concentration is between 11–20 mole percent.

50. A silicic optical fiber for use in optical amplifiers and sources, comprising:

a concentration of erbium ions for providing radiation when the quantum energy level of said erbium ions decays from $^4I_{13/2}$ metastable state to the $^4I_{15/2}$ ground level state;

a concentration of ytterbium ions for absorbing radiation as the quantum energy level of said ytterbium ions is excited from a thermally excited sub-level of the $^2F_{7/2}$ state to the $^2F_{5/2}$ metastable state and for exciting the quantum energy level of said erbium ions from the $^4I_{15/2}$ ground level state to the $^4I_{11/2}$ state when the quantum energy level of said ytterbium ions decays from the $^2F_{5/2}$ state back to the $^2F_{7/2}$ state; and a concentration of phosphate for reducing the decay time of the erbium ion quantum energy level from the $^4I_{11/2}$ state to the $^4I_{13/2}$ state to reduce back transfer of energy from said erbium ions to said ytterbium ions, wherein said fiber has less than 4 mole percent alumina, and wherein said phosphate concentration is approximately 15 mole percent.

\* \* \* \* \*